US007416773B2

(12) United States Patent
Hiyama et al.

(10) Patent No.: US 7,416,773 B2
(45) Date of Patent: Aug. 26, 2008

(54) SOUND ABSORBING BODY

(75) Inventors: Kunio Hiyama, Hamamatsu (JP); Masuhiro Okada, Kikugawa (JP); Hideo Suzuki, deceased, late of Hamamatsu (JP); by Emiko Suzuki, legal representative, Hamamatsu (JP); Yasutaka Nakamura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 11/907,809

(22) Filed: Oct. 17, 2007

(65) Prior Publication Data

US 2008/0093164 A1 Apr. 24, 2008

(30) Foreign Application Priority Data

Oct. 18, 2006 (JP) .......................... P 2006-284028

(51) Int. Cl.
*B32B 3/12* (2006.01)

(52) U.S. Cl. ......................... 428/117; 428/73; 181/286; 181/288; 181/294

(58) Field of Classification Search ................... 428/73, 428/117, 411.1, 69; 181/286, 288, 290, 294
See application file for complete search history.

(56) References Cited

U.S. PATENT DOCUMENTS 3,858,676 A * 1/1975 Le Masurier ................ 181/286
4,301,890 A * 11/1981 Zalas ......................... 181/286
5,149,920 A * 9/1992 Meeker et al. .............. 181/290
5,545,458 A * 8/1996 Fukushima et al. ......... 428/117
5,772,941 A * 6/1998 Nakano ...................... 264/175
5,776,573 A * 7/1998 Trotter et al. ............... 428/838
6,371,272 B1 * 4/2002 Walther et al. ................. 193/4
6,530,453 B1 * 3/2003 Miura et al. ................ 181/292
6,830,796 B2 * 12/2004 Murray et al. ................ 428/73
7,048,986 B2 * 5/2006 Shah et al. .................. 428/117
2007/0179229 A1 * 8/2007 Grass ......................... 524/287

FOREIGN PATENT DOCUMENTS

DE 20 2005 012 951 U 11/2005
JP 11-256720 A 9/1999
JP 2006-52377 A 2/2006
JP 2006-152785 A 6/2006

* cited by examiner

*Primary Examiner*—N Edwards
(74) *Attorney, Agent, or Firm*—Smith Patent Office

(57) ABSTRACT

In order to provide a sound-absorbing body which has both a thin thickness and improved sound-absorption characteristics with regard to a low tone range sounds, the sound-absorbing body (1) includes: an organic hybrid sheet (2) constituted from an organic low-molecular material which is spread in a matrix polymer; and a gastight air cell (3) which is closely provided at a backside (2*a*) of the organic hybrid sheet, wherein the organic hybrid sheet indicates both a sound-absorption peak of a random incidence sound-absorption coefficient at a frequency band of 400 Hz or lower and another sound-absorption peak when the organic hybrid sheet is vibrated by applying air vibration caused by sound, because of adhering the organic hybrid sheet to the gastight air cell.

7 Claims, 14 Drawing Sheets

SOUND ABSORBING BODY

BACKGROUND OF THE INVENTION

1. Field of the Invention

The present invention relates to a sound-absorbing body and especially relates to a thin sound-absorbing body which has excellent sound absorption characteristics with regard to a low tone range.

Priority is claimed on Japanese Patent Application No. 2006-284028, filed Oct. 18, 2006, the content of which is incorporated herein by reference.

2. Description of the Related Art

In conventional cases, there is a well-known sound-absorbing material which provides a backside airspace at the backside of a sheet made from a fiber material such as glass wool, a porous material or a vibration-damping constituent including a resin.

If the sound-absorbing material provides the sheet which is made from the fiber material or the porous material, there is a tendency in which the sound-absorbing material has less sound-absorbing characteristics if a frequency is lower. Therefore, in order to improve the sound-absorbing characteristics with regard to a low frequency band, it is necessary to increase the thickness of the sheet made from the fiber material or the porous material, and it is necessary to provide the backside airspace so as to have a sufficient thickness.

On the other hand, with regard to a sound-absorbing material which provides a resin sheet made from a vibration-damping constituent including a resin such as described in Patent Document 1 (Japanese Patent Application, First Publication No. 2006-52377), it is well-known that, if an air vibration caused by a sound is applied on a front side surface of the resin sheet which is made from the vibration-damping material including a resin, a first mode vibration is caused on the resin sheet itself. A frequency caused by the first mode vibration at a sound absorption peak is determined based on a rigidity of the resin sheet and a ratio of the thickness between the resin sheet and the backside airspace. Therefore, for example, if it is required to absorb sounds which have comparatively lower frequency, it is considered to be necessary to provide the backside airspace of a certain thickness or thicker.

Because of the above-described problems, if it is required to effectively absorb sounds of 500 Hz or lower by using the conventional sound-absorbing material, it is necessary to provide a considerably thick backside airspace. Therefore, there is a problem in achieving a sound-absorbing material which is thin and which has improved sound absorption characteristics with regard to a lower frequency band.

On the other hand, in conventional cases, a normal incidence sound-absorption coefficient is generally used as a measurement for evaluation when a sound-absorbing material is designed. However, in a practical case, sounds of random incidence hit the surface when the sound absorbing material is used.

Therefore, there is another problem in which an evaluation by using the normal incidence sound-absorption coefficient is not sufficient for designing the sound-absorbing material.

SUMMARY OF THE INVENTION

The present invention is conceived in order to solve the above-described problems. The present invention has an object to provide a sound-absorbing body which has both a thin thickness and improved sound-absorption characteristics with regard to a low tone range, and which has an improved random incidence sound-absorption coefficient.

In order to achieve the above-described objects, the present invention may provide the following constitutions.

A sound-absorbing body of the present invention preferably includes: an organic hybrid sheet constituted from an organic low-molecular material which is spread in a matrix polymer; and a gastight air cell which is closely provided at a backside of the organic hybrid sheet, wherein the organic hybrid sheet indicates both a first sound-absorption peak of a random incidence sound-absorption coefficient of 0.3 or higher at a first frequency band of 400 Hz or lower and a second sound-absorption peak of a random incidence sound-absorption coefficient of 0.3 or higher at a second frequency band higher than the first frequency band when the organic hybrid sheet is vibrated by applying air vibration caused by sound, because of adhering the organic hybrid sheet to the gastight air cell.

It is preferable that with regard to the above-described sound-absorbing body, the gastight air cell be plural and the plurality of gastight air cells be separated from each other.

It is preferable that with regard to the above-described sound-absorbing body, the gastight air cell be formed in a block by the backside of the organic hybrid sheet, a backside portion which face the backside of the organic hybrid sheet and a wall portion which stand on the backside portion toward the backside of the organic hybrid sheet and be arranged around the outside edge of the backside portion, and the wall portion and the backside of the organic hybrid sheet be tightly adhered to each other.

It is preferable that with regard to the above-described sound-absorbing body, the sound-absorbing body include a plurality of gastight air cells which are separated from each other by the wall portion.

It is preferable that with regard to the above-described sound-absorbing body, the thickness of the gastight air cell be in a range from 5 mm to 30 mm.

It is preferable that with regard to the above-described sound-absorbing body, the thickness of the organic hybrid sheet be in a range from 0.3 mm to 3 mm.

It is preferable that with regard to the above-described sound-absorbing body, the organic hybrid sheet be constituted by spreading N,N'-dicyclohexyl-2-benzothiazole sulfenamide in the matrix polymer which is made from chlorinated polyethylene, or the organic hybrid sheet be constituted by spreading diethylhexyl phthalate in the matrix polymer which is made from polyvinyl chloride.

In accordance with the above-described sound-absorbing body, the organic hybrid sheet is attached to the gastight air cells and is flexibly vibrated so as to indicate, when the air vibration of sound is applied, both a first sound-absorption peak of a sound-absorption coefficient of 0.3 or higher at a first frequency band of 400 Hz or lower and a second sound-absorption peak of a sound-absorption coefficient of 0.3 or higher at a second frequency band higher than the first frequency band. Therefore, it is possible to improve the random incidence sound-absorption coefficient at a low tone range.

The above-described sound-absorbing body includes the multiple gastight air cells. Therefore, it is possible to enlarge an area of the sound-absorbing body, and it is possible to use the sound-absorbing body as materials of a building or a construction. Moreover, the neighboring gastight air cells are separated from each other. Therefore, there is no possibility of the air flowing among the neighboring gastight air cells. And therefore, it is possible to prevent crosstalk among the gastight air cells, and it is possible to indicate a sound-absorption peak of a random incidence sound-absorption coefficient even at a frequency band of 400 Hz or lower.

Moreover, with regard to the sound-absorbing body, the thickness of the gastight air cells 3 is 30 mm or smaller. Therefore, compared to the conventional sound-absorbing body, it is possible to greatly reduce the thickness of the sound-absorbing body.

Furthermore, the thickness of the organic hybrid sheet is set in a range of 0.3-3.0 mm. Therefore, the sheet has appropriate rigidity and it is possible to adjust the sound-absorption peak so as to be close to a low frequency.

A sound-absorbing body of the present invention has both a thin thickness and improved sound-absorption characteristics with regard to a low tone range, and has an improved random incidence sound-absorption coefficient.

DETAILED DESCRIPTION OF THE INVENTION

Figure 1:
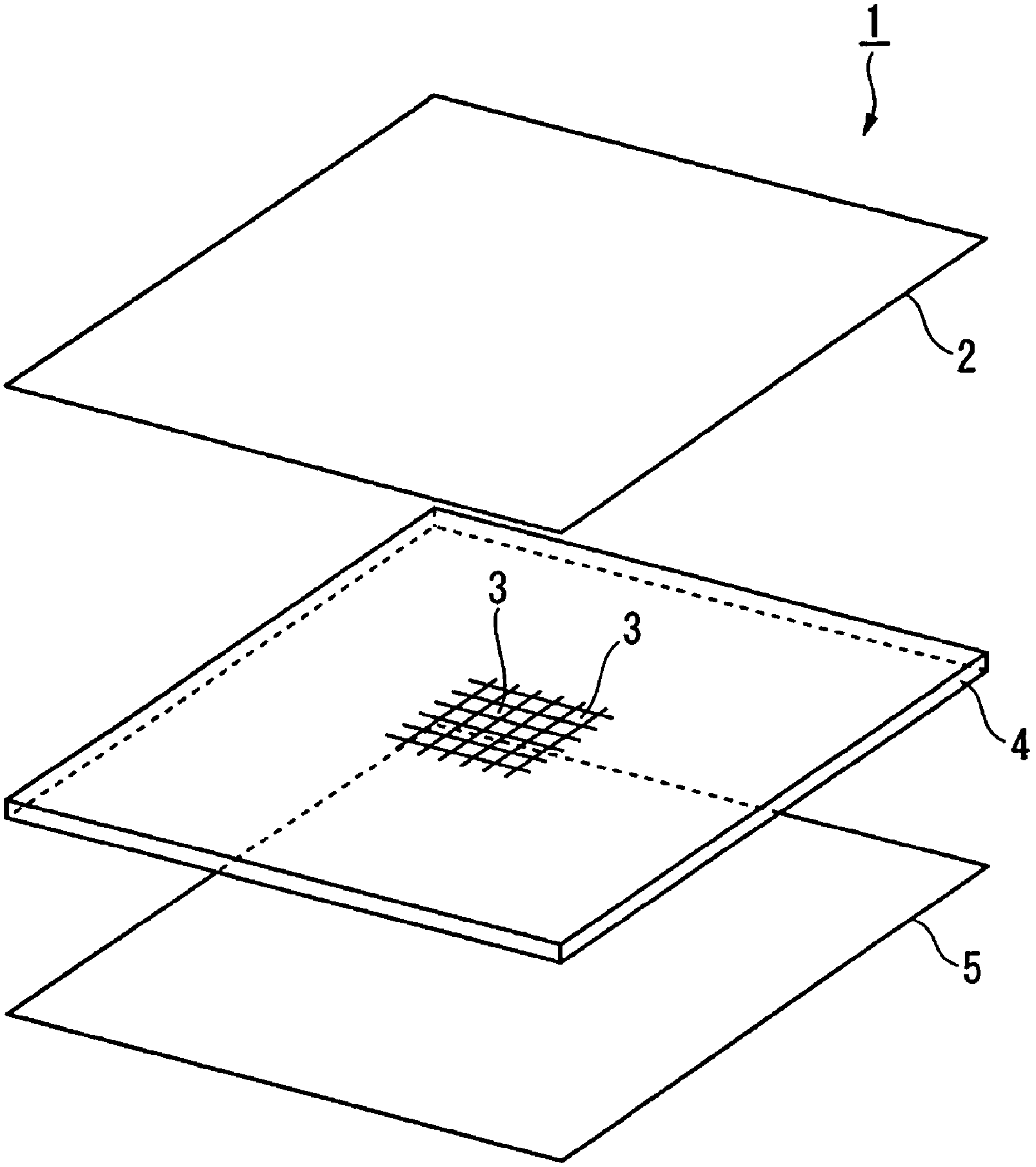
FIG. 1 is an exploded perspective drawing which shows a sound-absorbing body of one embodiment.
Figure 2:
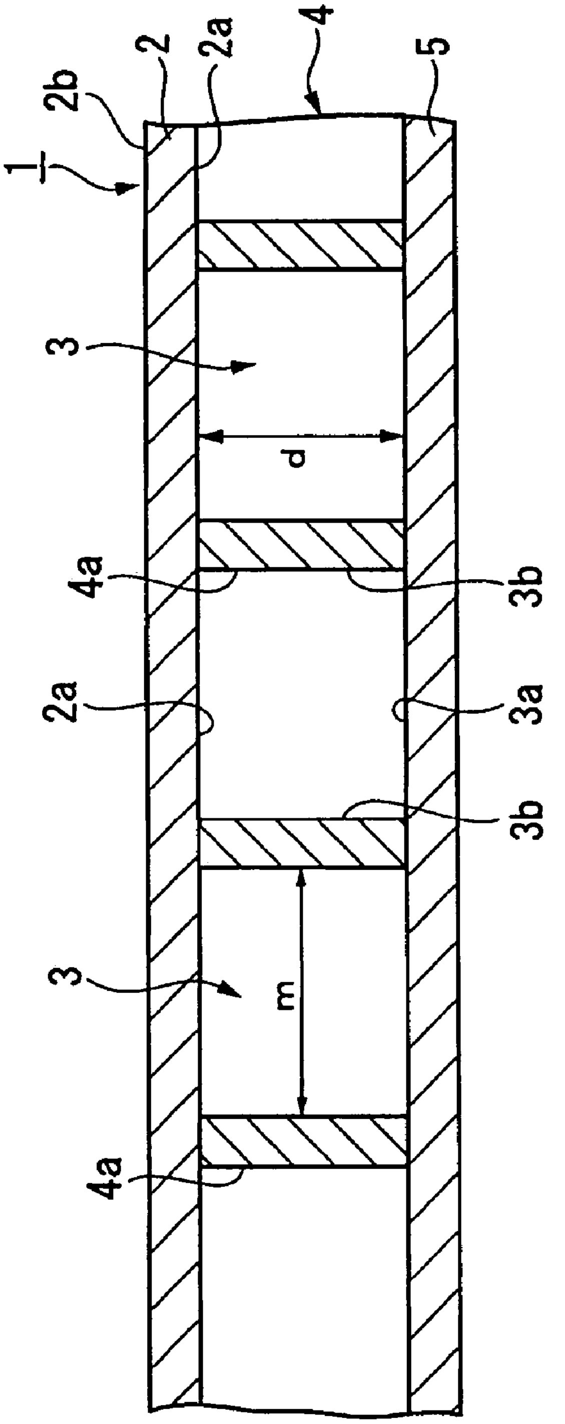
FIG. 2 is an enlarged outline sectional drawing which shows the sound-absorbing body of one embodiment.
Figure 3:
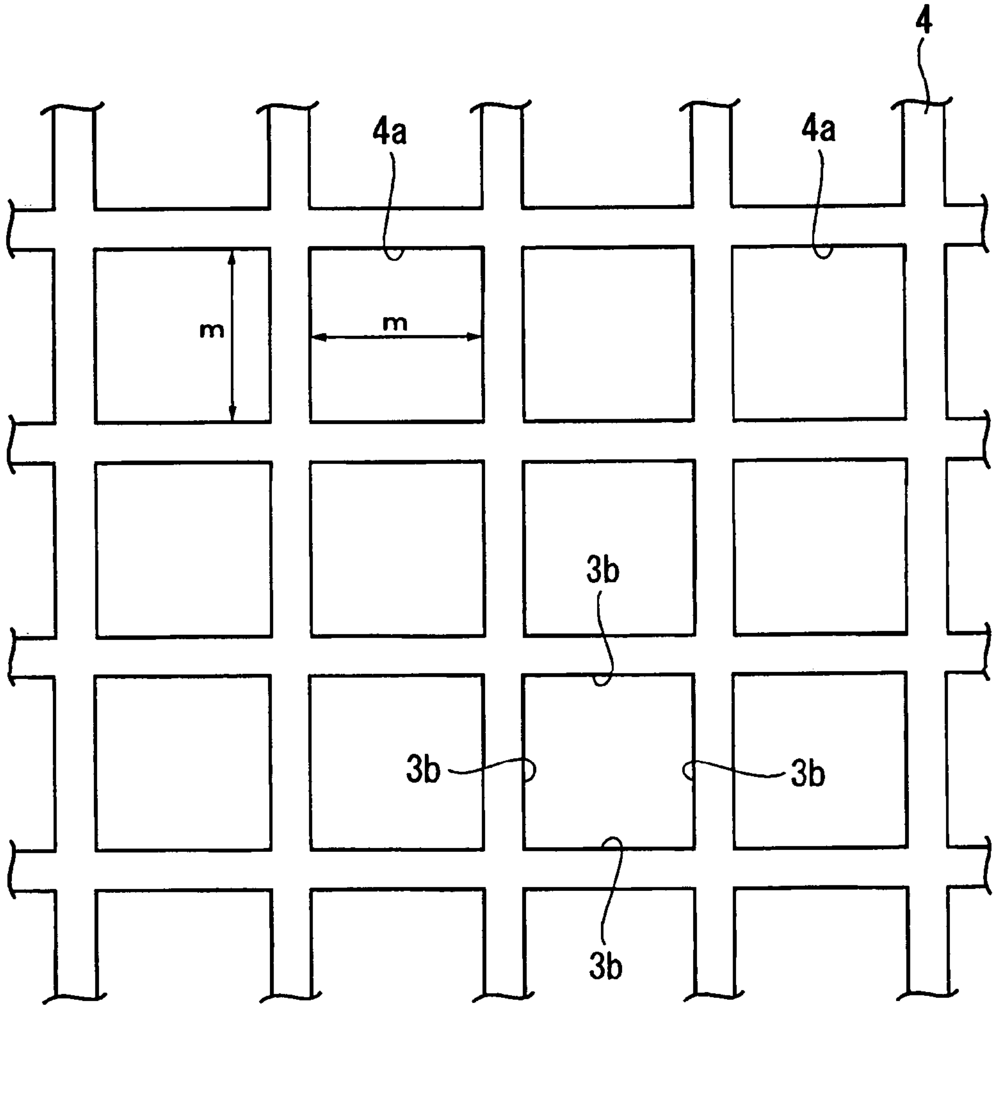
FIG. 3 is an enlarged outline plane drawing which shows an internal constitution of the sound-absorbing body of one embodiment.

Hereinafter, an embodiment of the present invention is explained with reference to drawings. FIG. 1 is an exploded perspective drawing which shows a sound-absorbing body of this embodiment. FIG. 2 is an enlarged outline sectional drawing which shows the sound-absorbing body of this embodiment. FIG. 3 is an enlarged outline plane drawing which shows an internal constitution of the sound-absorbing body of this embodiment.

As shown in FIGS. 1 and 2, a sound-absorbing body 1 of this embodiment has an outline constitution in which an organic hybrid sheet 2 and gastight air cells 3 which contact a backside surface 2*a* of the organic hybrid sheet 2. The organic hybrid sheet 2 is attached to the gastight air cells 3 so as to be flexibly vibrated and so as to simultaneously indicate two sound-absorption peaks when the air vibration of sound is applied from a side of the front surface 2*b*. More concretely, The organic hybrid sheet 2 is attached to the gastight air cells 3 so as to be flexibly vibrated and so as to simultaneously indicate both a first sound-absorption peak of a random incidence sound-absorption coefficient of 0.3 or higher at a first frequency band of 500 Hz or lower, more preferably, 400 Hz or lower, and a second sound-absorption peak of a random incidence sound-absorption coefficient of 0.3 or higher at a second frequency band which is higher than the first frequency band. It is preferable that the second frequency band be, for example, higher than 400 Hz.

"Organic Hybrid Sheet"

The organic hybrid sheet 2 is constituted in a manner in which an organic low-molecular material which is spread in a matrix polymer. It is preferable to apply the organic hybrid sheet constituted by spreading N,N'-dicyclohexyl-2-benzothiazole sulfenamide (hereinafter, DBS) in the matrix polymer which is made from chlorinated polyethylene, or the organic hybrid sheet constituted by spreading diethylhexyl phthalate (hereinafter, DEHP) in the matrix polymer which is made from polyvinyl chloride.

A mixing ratio of the matrix polymer and the organic low-molecular material is preferably in a range of 80:20-20:80 in a mass ratio, and is more preferably in a range of 50:50-30:70. If the mixing ratio is out of the above-described range, it is difficult to design the organic hybrid sheet 2 which is vibrated so as to indicate a sound-absorption peak of the random incidence sound-absorption coefficient at a frequency band of 400 Hz or lower when the air vibration of sound is applied.

It is supposed that, in the matrix polymer, the organic low-molecular material in the organic hybrid sheet 2 constitutes two crystal phases including a comparatively low-melting crystal and a comparatively high-melting crystal. It is supposed that these two crystal phases have different melting points in accordance with the organic low-molecular material. However, if the organic low-molecular material is DBS, it is supposed that the melting points of both the crystal phases are included in a range of 50-100° C., and furthermore, included in a range of 60-90° C. In such a case, two types of the crystal phases which respectively have different melting points are included in the matrix polymer. Therefore, it is possible to design the organic hybrid sheet 2 which is vibrated so as to indicate both a sound-absorption peak of the random incidence sound-absorption coefficient at a first frequency band of 400 Hz or lower and another sound-absorption peak at a second frequency band higher than the first frequency band when the air vibration of sound is applied.

It should be noted that it is possible to fill an inorganic filler to the organic hybrid sheet 2 by using, for example, mica, talc and carbon black.

The above-described organic hybrid sheet 2 is produced, for example, in a process including: mixing the matrix polymer, the organic low-molecular material and, if necessary, the inorganic filler by using such as a biaxial kneading machine; and after that, forming in a sheet by using a hot-press. In another way, it is possible to produce the above-described organic hybrid sheet 2 in a process including: leading the matrix polymer, the organic low-molecular material and, if necessary, the inorganic filler into such as an extrusion molding machine; and forming in a sheet by applying an extrusion process. Moreover, it is possible to apply a heating operation on the molded sheet. By applying a heating operation on the molded sheet, it is possible to increase a percentage of the low-molecular crystal contained in the matrix polymer. Therefore, it is possible to design the organic hybrid sheet 2 which is vibrated, when the air vibration of sound is applied, so as to indicate a sound-absorption peak of the random incidence sound-absorption coefficient of 0.3 or higher at a frequency band which is 400 Hz or lower and another sound-absorption peak of the random incidence sound-absorption coefficient of 0.3 or higher.

A thickness of the organic hybrid sheet 2 is preferably in a range of 0.3-3.0 mm, and is more preferably in a range of 0.5-1.5 mm. If the thickness of the organic hybrid sheet is in a range of 0.3-3.0 mm, the sheet 2 has appropriate rigidity and it is possible to adjust the sound-absorption peak so as to be close to a low frequency. Here, if the thickness of the organic hybrid sheet 2 is less than 0.3 mm, the rigidity of the organic hybrid sheet 2 is decreased and influence of an air spring caused by the gastight air cells 3 is increased. In such a case, the sound-absorption peak moves toward a high frequency, especially if the thickness of the gastight air cells is thin. Therefore, it is not preferable because the random incidence sound-absorption coefficient at a frequency band which is 400 Hz or lower is decreased. On the other hand, if the thickness of the organic hybrid sheet 2 is over 3 mm, an influence of the air spring caused by the gastight air cells 3 is reduced, but the sound-absorption peak moves toward a high frequency. Therefore, it is not preferable because the random incidence sound-absorption coefficient at a frequency band which is 400 Hz or lower is decreased. A frequency at which the maximal sound-absorption peak is obtained is determined in accordance with a balance between the rigidity of the organic hybrid sheet 2 and influence of the air spring caused by the gastight air cells 3. Therefore, it is preferable to appropriately adjust a relationship between the thickness of the organic hybrid sheet 2 and the size of the gastight air cells 3. Moreover, here, it is preferable to appropriately adjust a relationship between the thickness of the organic hybrid sheet 2 and the size of the gastight air cells 3 (thickness and a length of one edge of the gastight air cells 3) so as to indicate another sound-absorption peak at a frequency band larger than 400 Hz.

"Gastight Air Cells"

As shown in FIGS. 2 and 3, each of the gastight air cells 3 is formed in a block by the backside 2_a_ of the organic hybrid sheet 2, a backside portion 3_a_ which is arranged so as to face the backside 2_a_ and a wall portion 3_b_ which is provided so as to stand on the backside portion 3_a_ toward the backside 2_a_ around the outside edge of the backside portion 3_a_. Both the wall portion 3_b_ and the backside 2_a_ of the organic hybrid sheet are tightly adhered, and both the wall portion 3_b_ and the backside portion 3_a_ are tightly adhered. Therefore, each of the gastight air cells 3 is completely closed. As shown in FIGS. 1 and 3, the sound-absorbing body 1 of this embodiment has the multiple gastight air cells 3 arranged in a matrix state, and the gastight air cells 3 are respectively separated while each of them is completely closed.

With regard to the gastight air cells 3, in detail, each of the gastight air cells 3 is formed in a block by combining the organic hybrid sheet 2, a spacer member 4 in a matrix state arranged on a side of the backside 2_a_ of the organic hybrid sheet 2, and a backside plate 5 which is attached to the spacer member 4 so as to face the organic hybrid sheet 2.

The spacer member 4 is in a matrix state and constitutes the wall portion 3_b_ of the gastight air cells 3. The spacer member 4 has aperture portions 4_a_ which are arranged in a matrix state and which are in a substantially square shape (as shown in FIG. 3) when a surface of the spacer member 4 is seen from above or below. Moreover, the backside plate 5 is a member which constitutes the backside portion 3_a_ of the gastight air cells 3. The multiple gastight air cells 3 are formed by completely closing the multiple aperture portions 4_a_ of the spacer member 4 while the spacer 4 is set between the organic hybrid sheet 2 and the backside plate 5. The gastight air cells 3 are separated from each other by the wall portion 3_b_, and airflow among the gastight air cells 3 is completely blocked.

It is possible to produce the spacer member 4 and the backside plate 5 from various materials such as metal, wood, resin, fiber-reinforced resin, ceramic and a mixed material of these materials. Moreover, it is possible to apply the same material to the spacer member 4 and the backside plate 5, and it is possible to apply different materials to the spacer member 4 and the backside plate 5. Moreover, it is possible to apply the same material to the spacer member 4 or both the spacer member 4 and the backside plate 5 as the organic hybrid sheet 2.

It is possible to attach the spacer member 4 to the organic hybrid sheet 2 and the backside plate 5 by using an adhesive or a pressure-sensitive adhesive double-coated tape. Moreover, it is possible to attach the spacer member 4 to the backside plate 5 by heat-sealing if the spacer member 4 and the backside plate 5 are made from a resin. Moreover, it is possible to attach the spacer member 4 to the backside plate 5 by welding, brazing or soldering if the spacer member 4 and the backside plate 5 are made from a metal. Moreover, it is possible to form the spacer member 4 and the backside plate 5 so as to be one body by using a metal, resin, and the like.

It is preferable to set a thickness d of the gastight air cells 3 in a band of 5-30 mm. It is not preferable to set the thickness d of the gastight air cells 3 so as to be smaller than 5 mm because there is a possibility in which the sound-absorption peak moves toward a side of higher frequency than 500 Hz. It is not preferable to set the thickness d of the gastight air cells 3 so as to be larger than 30 mm because the sound-absorbing body 1 has a larger thickness and has less usability and less applicability. Moreover, it is more preferable to set a thickness of the gastight air cells 3 so as to be in a band which is 20 mm or larger and 30 mm or smaller even though it depends on the material and thickness of the organic hybrid sheet 2. It is possible to improve a peak of the random incidence sound-absorption coefficient at a frequency band lower which is 400 Hz or lower, if the thickness of the organic gastight air cells 3 is in this band.

Moreover, it is preferable to set a length or width m of the gastight air cell 3 when a surface of the spacer member 4 is seen from above or below (as shown in FIG. 3) so as to be longer than 10 mm and smaller than 1000 mm. If the length or width m is 10 mm or smaller or is 1000 mm or larger, it is difficult to vibrate the organic hybrid sheet 2 so as to indicate a sound-absorption peak of the random incidence sound-absorption coefficient at a frequency band which is 400 Hz or lower when the air vibration of sound is applied. Moreover, it is preferable to set the length or width m of the gastight air cells 3 so as to be in a band which is 75 mm or larger and 150 mm or smaller even though it depends on the material and thickness of the organic hybrid sheet 2. It is possible to improve a peak of the random incidence sound-absorption coefficient at a frequency band which is 400 Hz or lower, if the length m of one edge is in this band.

It should be noted that the sound-absorbing body shown in FIGS. 1-3 is an example in which the backside plate 5 is applied to the backside portion 3*a* which constitutes the gastight air cells 3. It is possible to use a wall, a ceiling, and/or the like which constitute a building instead of the backside plate 5. That is, it is possible to constitute the sound-absorbing body 1 in which the spacer member 4 is tightly attached to a wall, a floor, a ceiling, and/or the like which constitute the building by using such as an adhesive while the organic hybrid sheet 2 is adhered to the spacer member 4. In such a case, it is possible to use the building itself as a portion of the sound-absorbing body 1.

As described above, with regard to the sound-absorbing body 1, the organic hybrid sheet 2 is attached to the gastight air cells 3 and is flexibly vibrated so as to indicate, when the air vibration of sound is applied, both a first sound-absorption peak of the random incidence sound-absorption coefficient of 0.3 or larger at a frequency band which is 400 Hz or lower and a second sound-absorption peak of the random incidence sound-absorption coefficient of 0.3 or larger. Therefore, it is possible to improve the random incidence sound-absorption coefficient at a low tone range. Especially because the gastight air cells 3 are tightly closed, it is possible to reliably indicate the first sound-absorption peak even at a frequency band of 400 Hz or lower. Moreover, it is possible to improve the sound-absorption coefficient of a comparatively wide frequency range because the second sound-absorption peak appears at a side of frequency band which is higher than the frequency band of 400 Hz or lower.

Moreover, it is possible to improve the sound-absorption coefficient by using the above-described organic hybrid sheet 2.

The above-described sound-absorbing body 1 includes the multiple gastight air cells 3. Therefore, it is possible to enlarge an area of the sound-absorbing body 1, and it is possible to use the sound-absorbing body 1 as a building material. Moreover, the neighboring gastight air cells 3 are separated from each other. Therefore, there is no possibility in which the air flows through among the neighboring gastight air cells 3. And therefore, it is possible to prevent crosstalk among the gastight air cells 3, and it is possible to indicate a peak of a random incidence sound-absorption coefficient even at a frequency band of 400 Hz or lower.

Moreover, with regard to the sound-absorbing body 1, the thickness of the gastight air cells 3 is 30 mm or smaller. Therefore, compared to the conventional sound-absorbing body, it is possible to greatly reduce the thickness of the sound-absorbing body 1.

Furthermore, with regard to the above-described sound-absorbing body 1, the thickness of the organic hybrid sheet 2 is in a range of 0.3-3 mm. Therefore, the organic hybrid sheet 2 itself has an appropriate rigidity, and it is possible to move a sound-absorption peak toward a side of low frequency band.

It should be noted that the thickness d and the length or width m of the above-described gastight air cells 3 are examples. It is possible to set the thickness d and the length or width m in any ranges if the organic hybrid sheet 2 is attached to the gastight air cells 3 so as to indicate a sound-absorption peak at a frequency band of 400 Hz or lower when the air vibration of sound is applied from a side of the front surface 2*b* of the organic hybrid sheet 2.

Moreover, in the above-described embodiment, the gastight air cells 3 are arranged in a matrix state when a surface of the spacer member 4 is seen from above or below. However, this is not a limitation of the present invention. For example, with regard to the shape of the gastight air cells 3 on a surface of the spacer member 4 being seen from above or below, it is possible to apply a circle, an oval, a triangle, a rectangle, a rhombus, a parallelogram, a polygon such as a pentagon, a mixture of these shapes, and the like. Moreover, an arrangement of the gastight air cells 3 is not limited to a matrix state, and it is possible to randomly arrange the gastight air cells 3.

Moreover, with regard to the size of each of the gastight air cells 3 on a surface of the spacer member 4 being seen from above or below, as shown in the above-described embodiment, it is possible to set the same sizes to all of the gastight air cells 3 of the sound-absorbing body 1. However, it is possible to apply different size to each of the gastight air cells 3. Furthermore, with regard to the thickness d of each of the gastight air cells 3, as shown in the above-described embodiment, it is possible to set the same thickness to all of the gastight air cells 3 of the sound-absorbing body 1. However, this is not a limitation and it is possible to apply a different thickness d to each of the gastight air cells 3.

The sound-absorbing body 1 of the above-described embodiment is in a flat plate shape. However, this is not a limitation, and it is possible to produce the sound-absorbing body 1 so as to be curved from inside to outside, so as to be curved from outside to inside, so as to be a sphere surface curved from outside to inside, so as to be a sphere surface curved from inside to outside, or the like.

It is possible to apply any shapes if the organic hybrid sheet 2 is attached to the gastight air cells 3 so as to indicate a sound-absorption peak at a frequency band of 400 Hz or lower when the air vibration of sound is applied from a side of the front surface 2*b* of the organic hybrid sheet 2.

It is possible to apply the above-described sound-absorbing body 1 to various fields. For example, it is possible to apply the above-described sound-absorbing body 1 inside a car, a train, and the like in order to improve the acoustic absorption environment inside the car, the train, and the like because the above-described sound-absorbing body 1 has a smaller thickness than the conventional sound-absorbing body. Especially it is possible to adjust a shape of the above-described sound-absorbing body 1 so as to be not only a flat plate shape, but also a curved shape or sphere surface. Therefore, it is possible to attach the above-described sound-absorbing body 1 to such as inside walls of a car which can have various shapes.

Moreover, if the above-described sound-absorbing body 1 is set inside an electric product, it is possible to reduce noise from the electric product. Therefore, it is possible to make the electric product silent.

Moreover, it is possible to apply the above-described sound-absorbing body 1 to a speaker, a musical instrument, an electric musical instrument, and the like. It is possible to improve acoustic characteristics of a low tone range of these products by applying the above-described sound-absorbing body 1.

Moreover, as described above, the sound-absorbing body 1 is formed by tightly attaching the spacer portion directly to the building and by attaching the organic hybrid sheet. Therefore, it is useful for designing and building an audition room, a sound-proof room, and the like.

EXAMPLES

Hereinafter, as shown below, detailed examples with regard to the present invention are explained.

Figure 4:
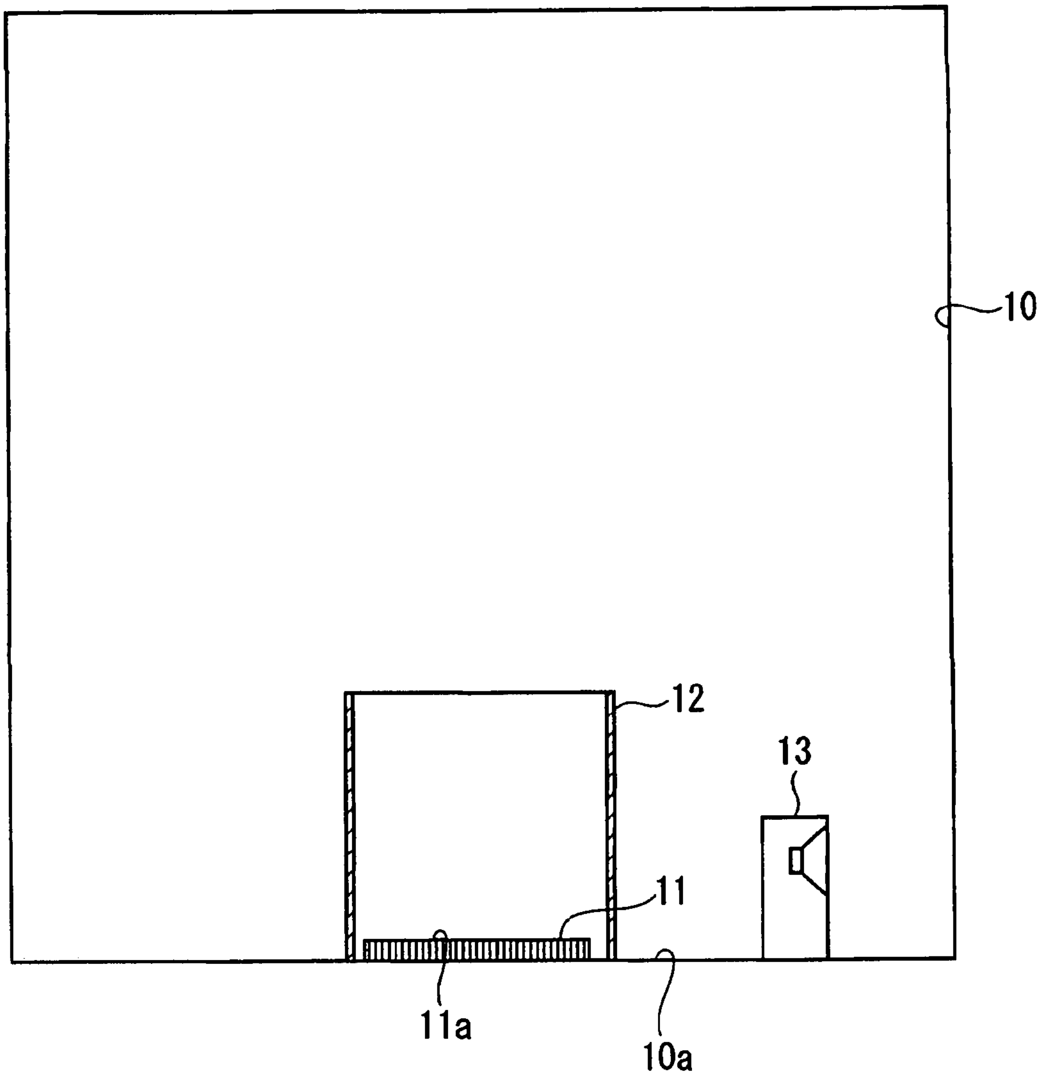
FIG. 4 is an outline drawing which shows a measurement room used in one example for measuring a random incidence sound-absorption coefficient.

In the following examples, the random incidence sound-absorption coefficient was used as an index for evaluation when each of sound-absorbing bodies of the examples was evaluated. The random incidence sound-absorption coefficient is called a reverberant sound absorption coefficient, which is obtained by using a method according to JIS (Japanese Industrial Standards) A 1409, and which is calculated based on a decay time of reverberant sound caused by suddenly stopping the sound in a reverberant sound room. In the following examples, as shown in FIG. 4, on a substantially center portion of a floor 10*a* inside a reverberant sound room 10 which has a volume (V) of 64 $m^3$, superficies (S) of 100 $m^2$ and V/S=0.64, a sound-absorbing body 11 of the following examples and comparative examples that has a length of 1 m and width of 1 m was set. A diffuser panel frame 12 which has a height of 800 mm and which is made from an acrylic board having a thickness of 20 mm is set around the sound-absorbing body 11. A sound source 13 was set at a position which was apart from the sound-absorbing body 11. In such a manner, sounds (air vibration caused by sound) of random incidence hit a front surface 11*a* of the sound-absorbing body 11.

"First Experiment"

First Example

In this example, an organic hybrid sheet was prepared which had a thickness of 0.7 mm and which was produced by mixing chlorinated polyethylene (hereinafter, CPE) and DBS at a mass ratio of DBS/CPE=50/50. A spacer member having a thickness of 5 mm was prepared which was made from wood, and which had aperture portions of a length of 100 mm and width of 100 mm formed in matrix state and separated by a wall portion which has a width of 9 mm. A backside plate was prepared which had thickness of 20 mm and which was made from acrylic resin. The organic hybrid sheet, the spacer member and the backside plate described above were combined so as to be overlapped on each other and were tightly attached to each other by using an adhesive. Therefore, the sound absorbing body of the first example that had a length of 1 m, width of 1 m and thickness of 25.7 mm was produced. Gastight air cells (backside air cells) of the sound-absorbing body were produced and had a length of 100 mm, width of 100 mm and thickness of 5 mm.

Example 2

Except for using a spacer member which had thickness of 10 mm, a sound-absorbing body of an Example 2 was made in the same manner as the above-described example 1. Gastight air cells (backside air cells) of the sound-absorbing body were produced and had a length of 100 mm, width of 100 mm and thickness of 10 mm.

Comparative Example 1

Except for using a Si rubber sheet which had thickness of 0.7 mm in place of the organic hybrid sheet, a sound-absorbing body of Comparative example 1 was made in the same manner as the above-described first example. Gastight air cells (backside air cells) of the sound-absorbing body were produced and had a length of 100 mm, width of 100 mm and thickness of 5 mm.

Comparative Example 2

Except for using a Si rubber sheet which had thickness of 0.7 mm in place of the organic hybrid sheet and using a spacer member which had a thickness of 10 mm, a sound-absorbing body of Comparative example 2 was made in the same manner as the above-described example 1. Gastight air cells (backside air cells) of the sound-absorbing body were produced and had a length of 100 mm, width of 100 mm and thickness of 10 mm.

The random incidence sound-absorption coefficients of the sound-absorbing bodies of the Examples 1-2 and the Comparative examples 1-2 were measured. Measured results are shown in Table 1 and FIG. 5.

Figure 5:
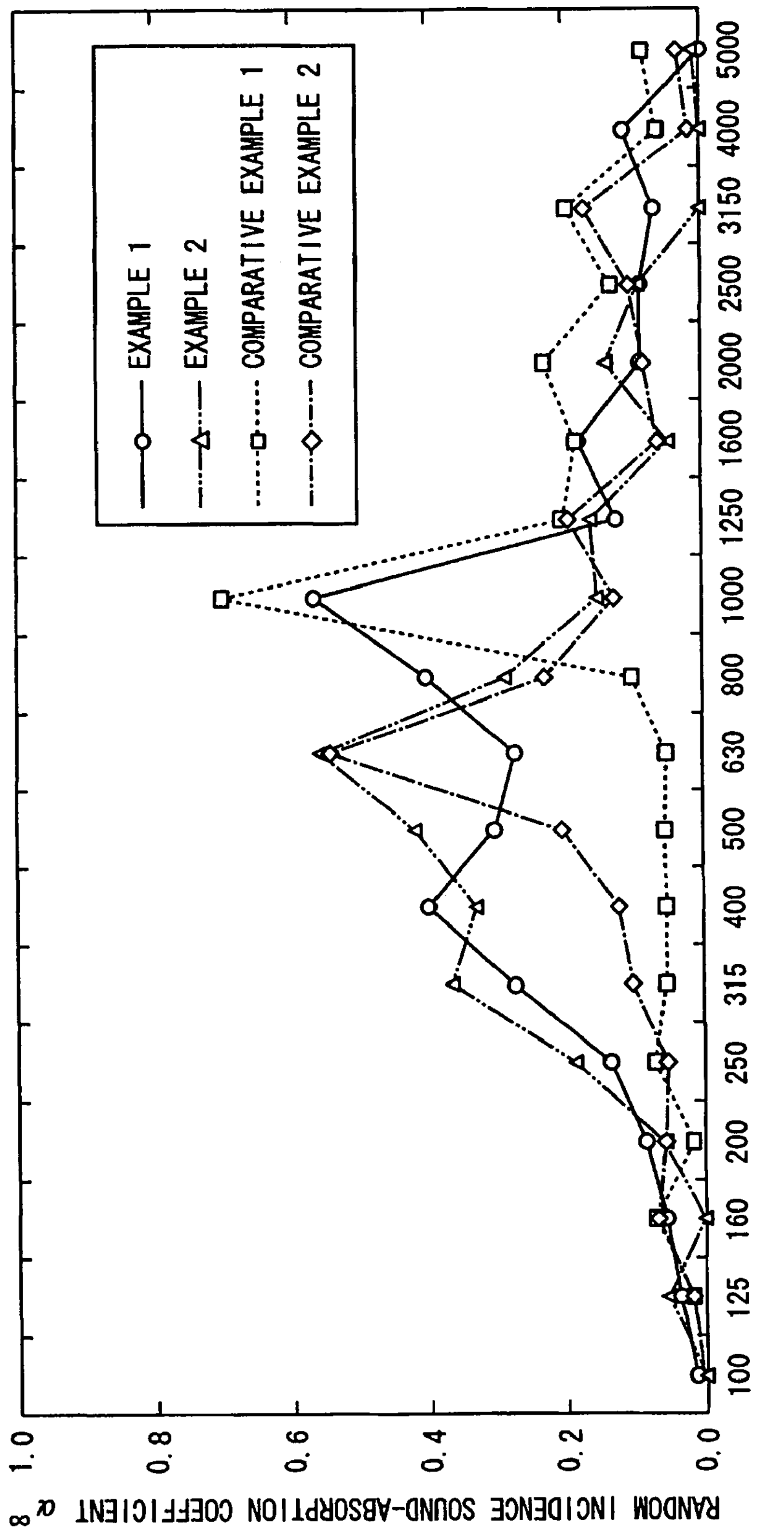
FIG. 5 is a graph which shows a relationship between frequencies and random incidence sound-absorption coefficients of Examples 1 and 2 and Comparative examples 1 and 2.

As shown in Table 1 and FIG. 5, with regard to Example 1, a sound-absorption peak with a random incidence sound-absorption coefficient of 0.4 around 400 Hz was recognized (sound-absorption peak at a frequency band lower than 500 Hz), and another sound-absorption peak with a random incidence sound-absorption coefficient of approximately 0.56 around 1000 Hz was recognized.

With regard to Example 2, a sound-absorption peak with a random incidence sound-absorption coefficient of 0.36 around 315 Hz was recognized (sound-absorption peak at a frequency band lower than 500 Hz), and another sound-absorption peak with a random incidence sound-absorption coefficient of 0.56 around 630 Hz was recognized.

On the other hand, with regard to Comparative example 1, a sound-absorption peak with a random incidence sound-absorption coefficient of 0.7 around 1000 Hz was recognized, but no sound-absorption peak was recognized at a frequency band of 400 Hz or lower. Likewise, with regard to Comparative example 2, a sound-absorption peak with a random incidence sound-absorption coefficient of 0.56 around 630 Hz was recognized, but no sound-absorption peak was observed at a frequency band of 400 Hz or lower.

As described above, with regard to Examples 1 and 2, sound-absorption peaks were recognized at a frequency band of 400 Hz or lower, but with regard to Comparative examples 1 and 2, no sound-absorption peak was recognized at a frequency band of 400 Hz or lower. Therefore, it was observed that the sound-absorbing bodies of Examples 1 and 2 which had the organic hybrid sheets had better random incidence sound-absorption coefficients at a frequency band of 400 Hz or lower.

"Second Experiment"

Example 3

Figure 6A:
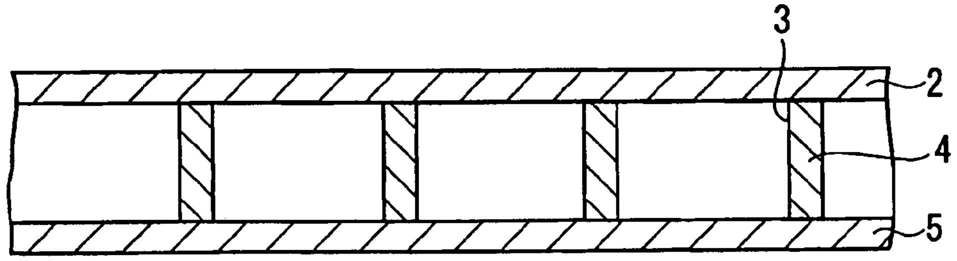
FIG. 6A is an enlarged outline sectional drawing of a sound-absorbing body of Example 3.

In this example, the organic hybrid sheet 2 was prepared which was produced by mixing CPE and DBS at a mass ratio of DBS/CPE=50/50 and which had thickness of 1.0 mm. Moreover, a spacer member 4 having a thickness of 10 mm was prepared which was made from wood, and which had aperture portions of a length of 100 mm and width of 100 mm formed in matrix state and separated by a wall portion that had a width of 9 mm. A backside plate was prepared which had thickness of 20 mm and which was made from acrylic resin. The organic hybrid sheet 2, the spacer member 4 and the backside plate 5 described above were combined so as to be overlapped on each other and were tightly attached to each other by using an adhesive. Therefore, as shown in FIG. 6A, the sound absorbing body of Example 3 that had a length of 1 m, width of 1 m and thickness of 31 mm was produced. Gastight air cells 3 (backside air cells) of the sound-absorbing body were produced and had a length of 100 mm, width of 100 mm and thickness of 10 mm.

Example 4

Figure 6B:
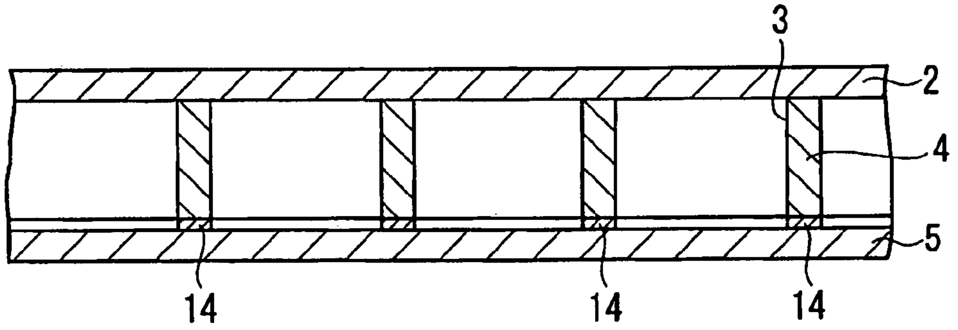
FIG. 6B is an enlarged outline sectional drawing of a sound-absorbing body of Example 4

As shown in FIG. 6B, the organic hybrid sheet 2 was attached to the spacer member 4 by using an adhesive, and a sound-absorbing body of Example 4 was produced in the same manner as Example 3 except for putting an argil member 14 having a thickness of 0.1 mm between the spacer member 4 and the backside plate 5 which were arranged so as to be overlapped. Gastight air cells 3 (backside air cells) of the sound-absorbing body were produced and had a length of 100 mm, width of 100 mm and thickness of 10.1 mm. It should be noted that the backside air cells were sufficiently gastight because the argil member 14 was set between the spacer member 4 and the backside plate 5.

Example 5

Figure 6C:
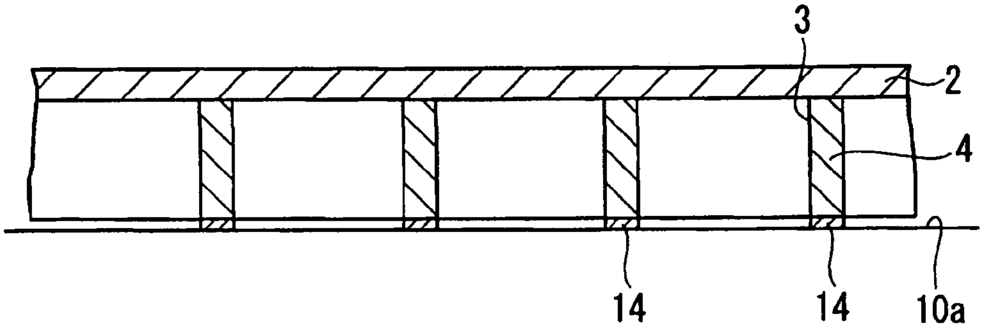
FIG. 6C is an enlarged outline sectional drawing of a sound-absorbing body of Example 5.

As shown in FIG. 6C, in order to produce a sound-absorbing body of Example 5, the same organic hybrid sheet as Example 3 and the same spacer member as Example 3 were prepared and attached to each other so as to be overlapped by using an adhesive. However, as shown in FIG. 6C, the sound-absorbing body of Example 5 was different from Example 3 due to only one point in which the argil member 14 having a thickness of 0.1 mm was set between the floor 10*a* inside the reverberation room 10 and the spacer member 4 on which the organic hybrid sheet 2 was adhered. Gastight air cells 3 (backside air cells) of the sound-absorbing body were produced and had a length of 100 mm, width of 100 mm and thickness of 10.1 mm. It should be noted that the backside air cells were sufficiently gastight because the argil member 14 was set between the spacer member 4 and the floor 10*a*.

Comparative Example 3

Figure 6D:
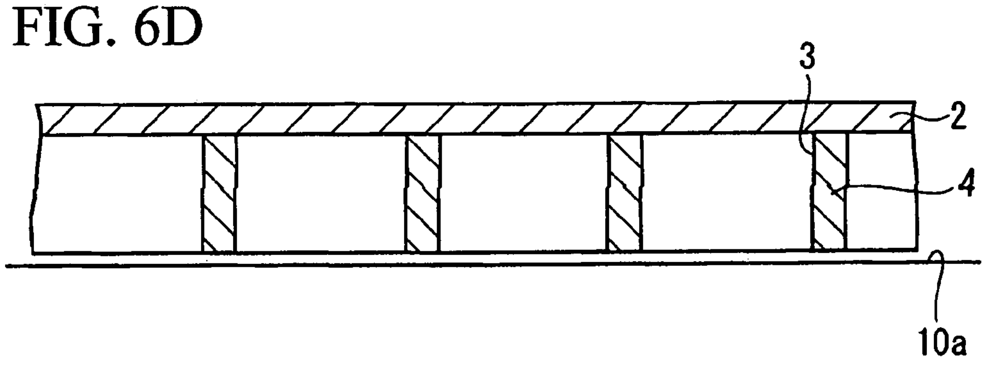
FIG. 6D is an enlarged outline sectional drawing of a sound-absorbing body of Comparative Example 3.

As shown in FIG. 6D, in order to produce a sound-absorbing body of Comparative example 3, the same organic hybrid sheet as Example 3 and the same spacer member as Example 3 were prepared and attached to each other so as to be overlapped by using an adhesive. However, as shown in FIG. 6D, the sound-absorbing body of Comparative example 3 was different from Example 3 in only one point in which the spacer member 4 on which the organic hybrid sheet 2 was adhered was simply set on the floor 10*a* inside the reverberation room 10. Gastight air cells 3 (backside air cells) of the sound-absorbing body were produced and had a length of 100 mm, width of 100 mm and thickness of 10 mm. It should be noted that the backside air cells were insufficiently gastight because there were small gaps between the spacer member 4 and the floor 10*a*.

The random incidence sound-absorption coefficients of the sound-absorbing bodies of Examples 3-5 and Comparative example 3 were measured. Measured results were shown in Table 1 and FIG. 7.

Figure 7:
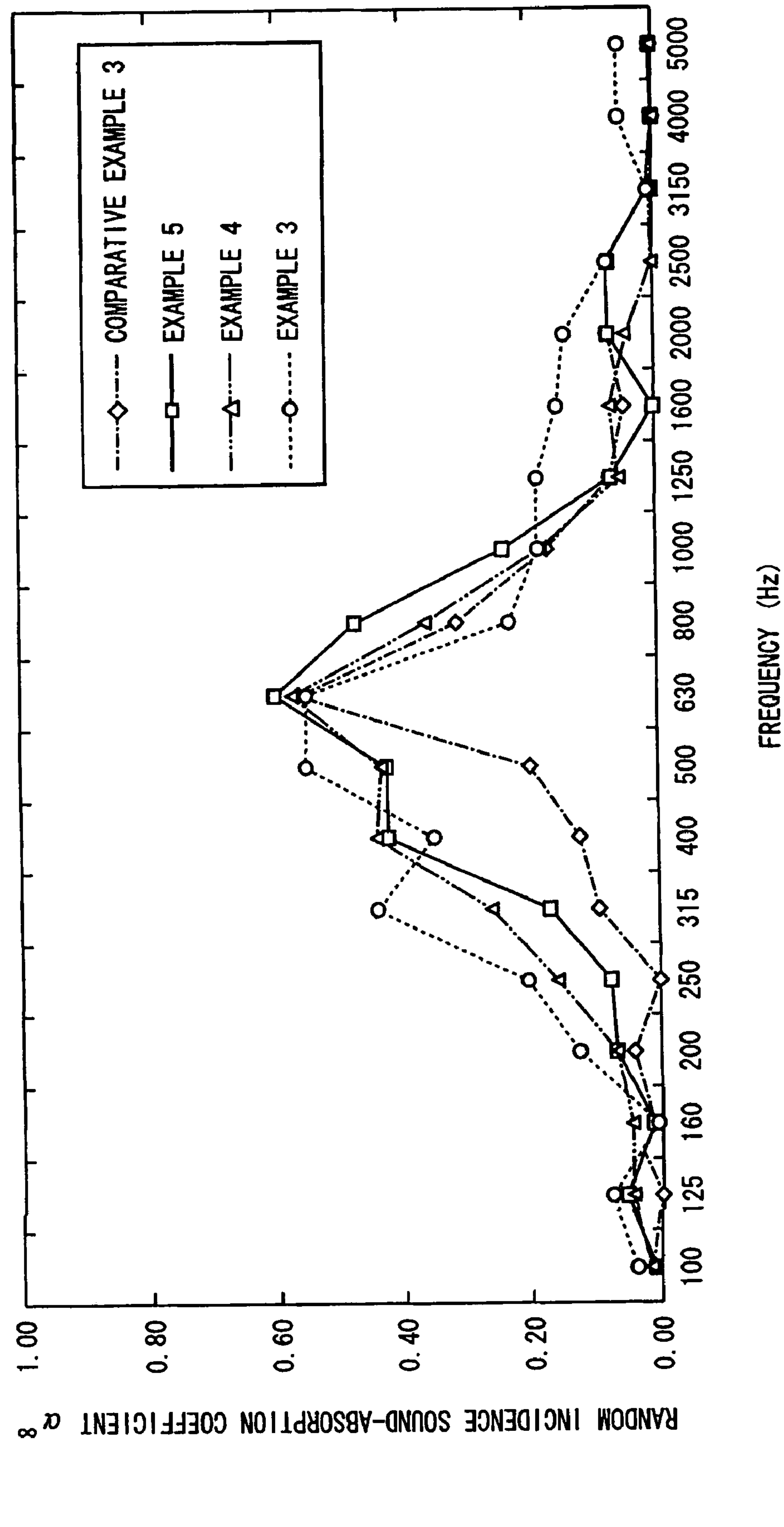
FIG. 7 is a graph which shows a relationship between frequencies and random incidence sound-absorption coefficients of Examples 3-5 and a Comparative example 3.

As shown in Table 1 and FIG. 7, with regard to Example 3, a sound-absorption peak with a random incidence sound-absorption coefficient of 0.44 around 315 Hz was recognized (sound-absorption peak at a frequency band lower than 500 Hz), and another sound-absorption peak with a random incidence sound-absorption coefficient of approximately 0.55 around 500-630 Hz was recognized.

Moreover, with regard to Examples 4 and 5, sound-absorption peaks with a random incidence sound-absorption coefficient of 0.42-0.44 around 400 Hz was recognized (sound-absorption peak at a frequency band lower than 500 Hz), and another sound-absorption peak with a random incidence sound-absorption coefficient of 0.60 around 630 Hz was recognized.

On the other hand, with regard to Comparative example 3, a sound-absorption peak with a random incidence sound-absorption coefficient of 0.6 around 630 Hz was recognized, but no sound-absorption peak was recognized at a frequency band of 400 Hz or lower.

As described above, with regard to Examples 3-5, sound-absorption peaks were observed at a frequency band of 400 Hz or lower because the gastight air cells were completely gastight. In Comparative example 3, the gastight air cells were not completely gastight, and therefore, vibrations caused by air springs were transmitted among the cells and crosstalk was caused. It was considered that this was the reason why no sound-absorption peak was observed at a frequency band of 400 Hz or lower. Therefore, it was observed that the sound-absorbing bodies of Examples 3-5 which had the gastight air cells that were tightly closed had better random incidence sound-absorption coefficients at a frequency band of 400 Hz or lower.

"Experiment 3"

Example 6

In this example, an organic hybrid sheet was prepared which was produced by mixing CPE and DBS at a mass ratio of DBS/CPE=50/50 and which had thickness of 1.0 mm. Moreover, a spacer member having a thickness of 10 mm was prepared which was made from wood, and which had aperture portions of a length of 75 mm and width of 75 mm formed in matrix state and separated by a wall portion that had a width of 9 mm. A backside plate was prepared which had thickness of 20 mm and which was made from acrylic resin. The organic hybrid sheet, the spacer member and the backside plate described above were combined so as to be overlapped on each other and were tightly attached to each other by using an adhesive. Therefore, the sound absorbing body of Example 6 that had a length of 1 m, width of 1 m and thickness of 31 mm was produced. Gastight air cells (backside air cells) of the sound-absorbing body were produced and had a length of 75 mm, width of 75 mm and thickness of 10 mm.

Example 7

Except for using a spacer member which had thickness of 10 mm and which had aperture portions of a length of 100 mm and width of 100 mm, a sound-absorbing body of Example 7 was made in the same manner as above-described Example 6. Gastight air cells (backside air cells) of the sound-absorbing body were produced and had a length of 100 mm, width of 100 mm and thickness of 10 mm.

Example 8

Except for using a spacer member which had thickness of 10 mm and which had aperture portions having a length of 150 mm and width of 150 mm, a sound-absorbing body of an example eight was made in the same manner as above-described Example 6. Gastight air cells (backside air cells) of the sound-absorbing body were produced and had a length of 150 mm, width of 150 mm and thickness of 10 mm.

Comparative Example 4

Except for using a Si rubber sheet which had thickness of 1.0 mm in place of the organic hybrid sheet, and except for using a spacer member which had thickness of 10 mm and which had aperture portions having a length of 150 mm and width of 150 mm, a sound-absorbing body of Comparative example 4 was made in the same manner as above-described Example 6. Gastight air cells (backside air cells) of the sound-absorbing body were produced and had a length of 150 mm, width of 150 mm and thickness of 10 mm.

Comparative Example 5

A sheet made of a glass wool having thickness of 10 mm was used as the sound-absorbing body of Comparative example 5.

Comparative Example 6

Except for using an organic hybrid sheet which was produced by mixing CPE and DBS at a mass ratio of DBS/CPE=70/30 and which had thickness of 1.0 mm, and except for using a spacer member which had thickness of 10 mm and which had an aperture portion having a length of 1000 mm and width of 1000 mm, a sound-absorbing body of Comparative example 6 was made in the same manner as above-described Example 6. A gastight air cell (backside air cell) of the sound-absorbing body was produced and had a length of 1000 mm, width of 1000 mm and thickness of 10 mm.

Comparative Example 7

Except for using an organic hybrid sheet which was produced by mixing CPE and DBS at a mass ratio of DBS/CPE=70/30 and which had thickness of 1.0 mm, and except for using a spacer member which had thickness of 10 mm and which had an aperture portions having a length of 10 mm and width of 10 mm, a sound-absorbing body of Comparative example 7 was made in the same manner as above-described Example 6. Gastight air cells (backside air cells) of the sound-absorbing body were produced and had a length of 10 mm, width of 10 mm and thickness of 10 mm.

The random incidence sound-absorption coefficients of the sound-absorbing bodies of Examples 6-8 and Comparative examples 4-7 were measured. Measured results were shown in Table 1 and FIG. 8.

Figure 8:
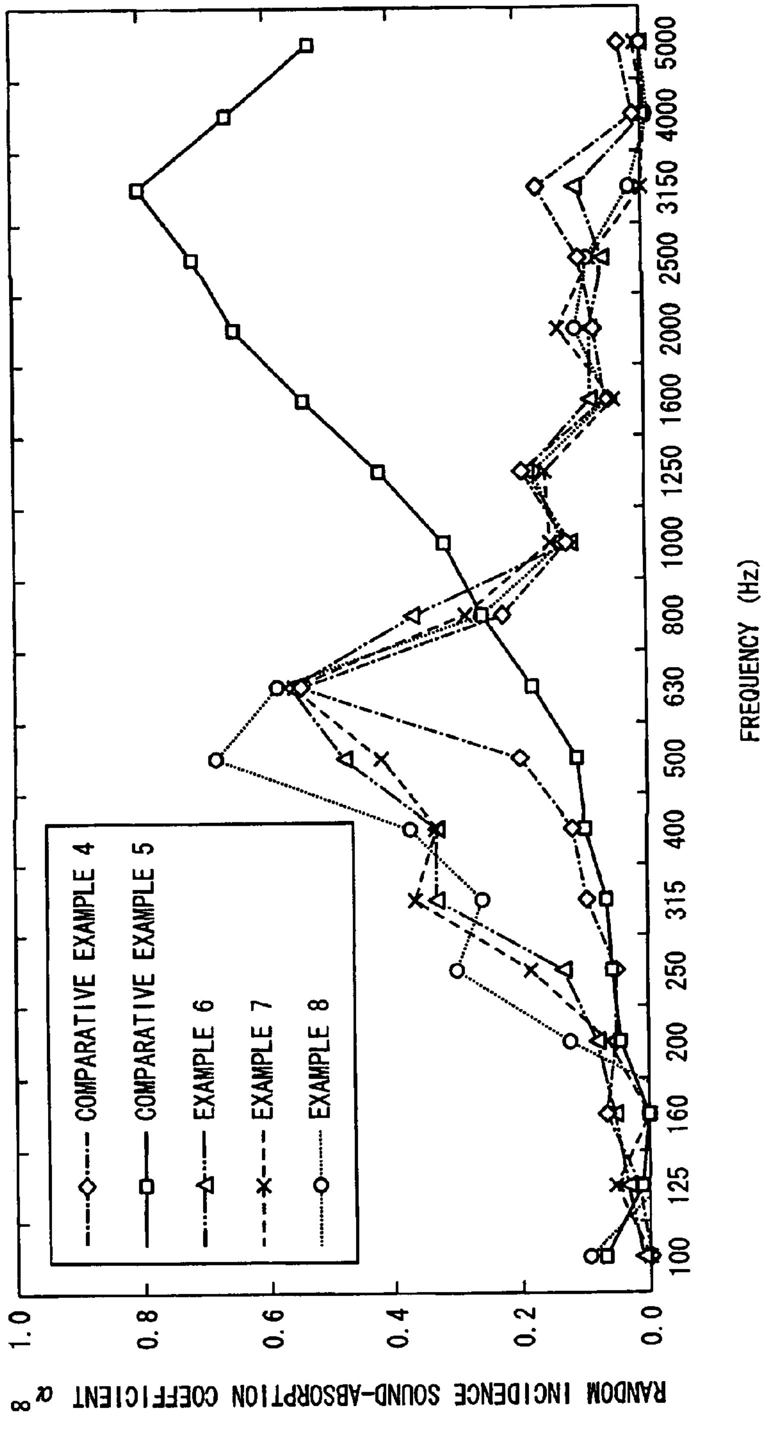
FIG. 8 is a graph which shows a relationship between frequencies and random incidence sound-absorption coefficients of Examples 6-8 and Comparative examples 4 and 5.

As shown in Table 1 and FIG. 8, with regard to Examples 6-8, sound-absorption peaks with random incidence sound-absorption coefficients of approximately 0.3-0.36 around 250-315 Hz were recognized (sound-absorption peak at a frequency band lower than 500 Hz), and other sound-absorption peaks with a random incidence sound-absorption coefficients of approximately 0.55-0.7 around 500-630 Hz were recognized.

On the other hand, with regard to Comparative example 4, a sound-absorption peak with a random incidence sound-absorption coefficient of 0.55 around 630 Hz was recognized, but no sound-absorption peak was recognized at a frequency band of 400 Hz or lower.

Moreover, with regard to Comparative example 5, a sound-absorption peak with a random incidence sound-absorption coefficient of 0.8 around 3150 Hz was recognized, but no sound-absorption peak was recognized at a frequency band of 400 Hz or lower.

Furthermore, with regard to Comparative examples 6 and 7, no sound-absorption peak was recognized at a frequency band of 400 Hz or lower.

As described above, with regard to Examples 6-8, sound absorption peaks were recognized at a frequency band of 400 Hz or lower when a height and a width of the gastight air cells were set so as to be in a range of 75-150 mm, and it was recognized that Examples 6-8 indicate excellent sound absorption characteristics especially with regard to a low tone range. On the other hand, with regard to Comparative examples 4, 6 and 7, no sound absorption peak was recognized at a frequency band of 400 Hz or lower, and it was recognized that Comparative examples 4, 6 and 7 had poor sound absorption characteristics with regard to a low tone range. Moreover, with regard to Comparative example 5, it was recognized that Comparative example 5 had good sound absorption characteristics with regard to high tone range but had poor sound absorption characteristics with regard to low tone range of a frequency band of 400 Hz or lower.

"Experiment 4"

Examples 9-14

In these examples, an organic hybrid sheet was prepared which was produced by mixing CPE and DBS at a mass ratio of DBS/CPE=70/30 and which had thickness of 1.0-1.5 mm. Moreover, a spacer member having a thickness of 10-30 mm was prepared which was made from wood, and which had aperture portions of a length of 100 mm and width of 100 mm formed in matrix state and separated by a wall portion that had a width of 9 mm. A backside plate was prepared which had thickness of 20 mm and which was made from acrylic resin. The organic hybrid sheet, the spacer member and the backside plate described above were combined so as to be overlapped on each other and were tightly attached to each other by using an adhesive. Therefore, the sound absorbing bodies of Examples 9-14 shown in Table 1 that had a length of 1 m, width of 1 m and thickness of 31-51.5 mm were produced.

The random incidence sound-absorption coefficients of the sound-absorbing bodies of Examples 9-14 were measured. Measured results were shown in Table 1 and FIGS. 9 and 10.

Figure 9:
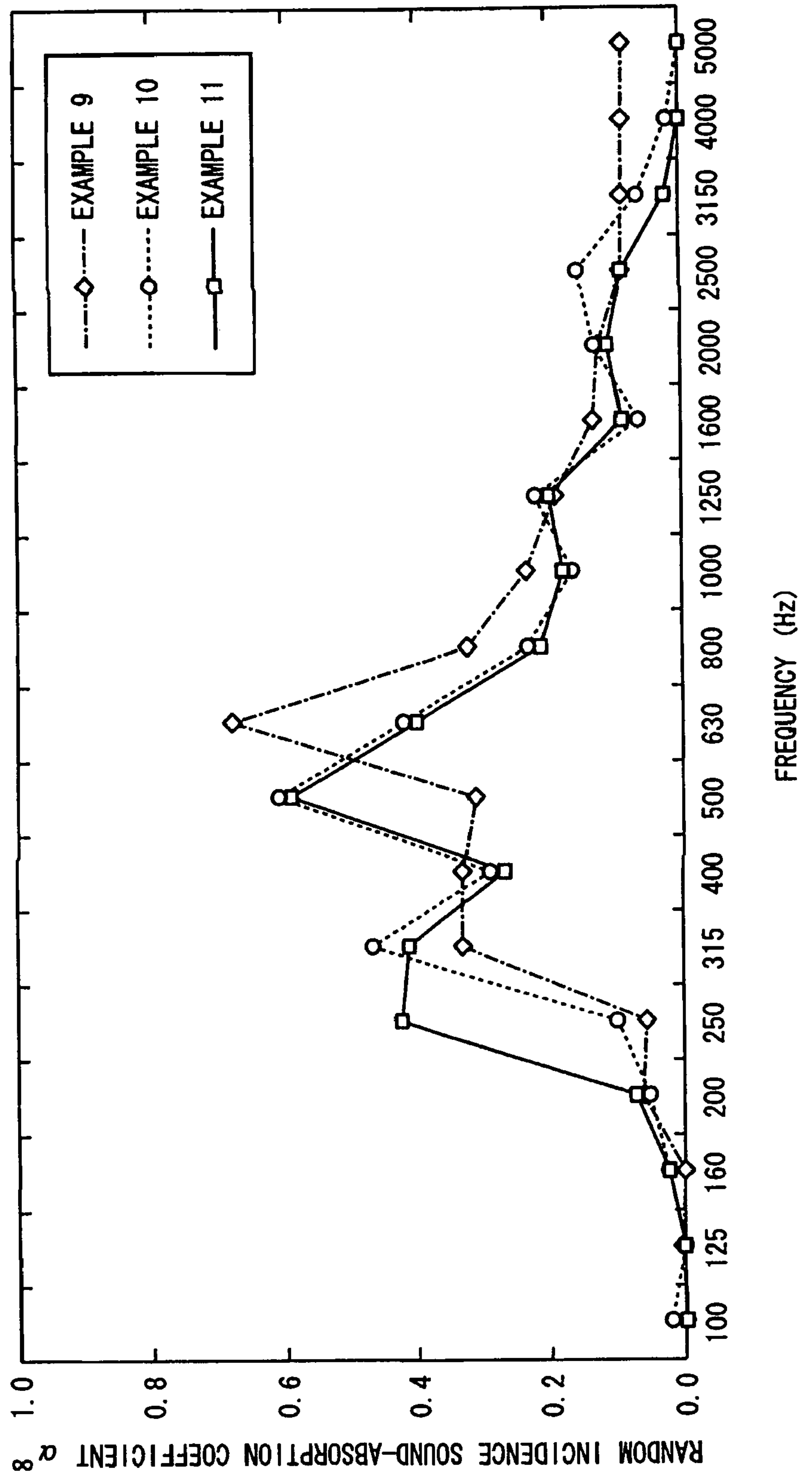
FIG. 9 is a graph which shows a relationship between frequencies and random incidence sound-absorption coefficients of Examples 9-11.
Figure 10:
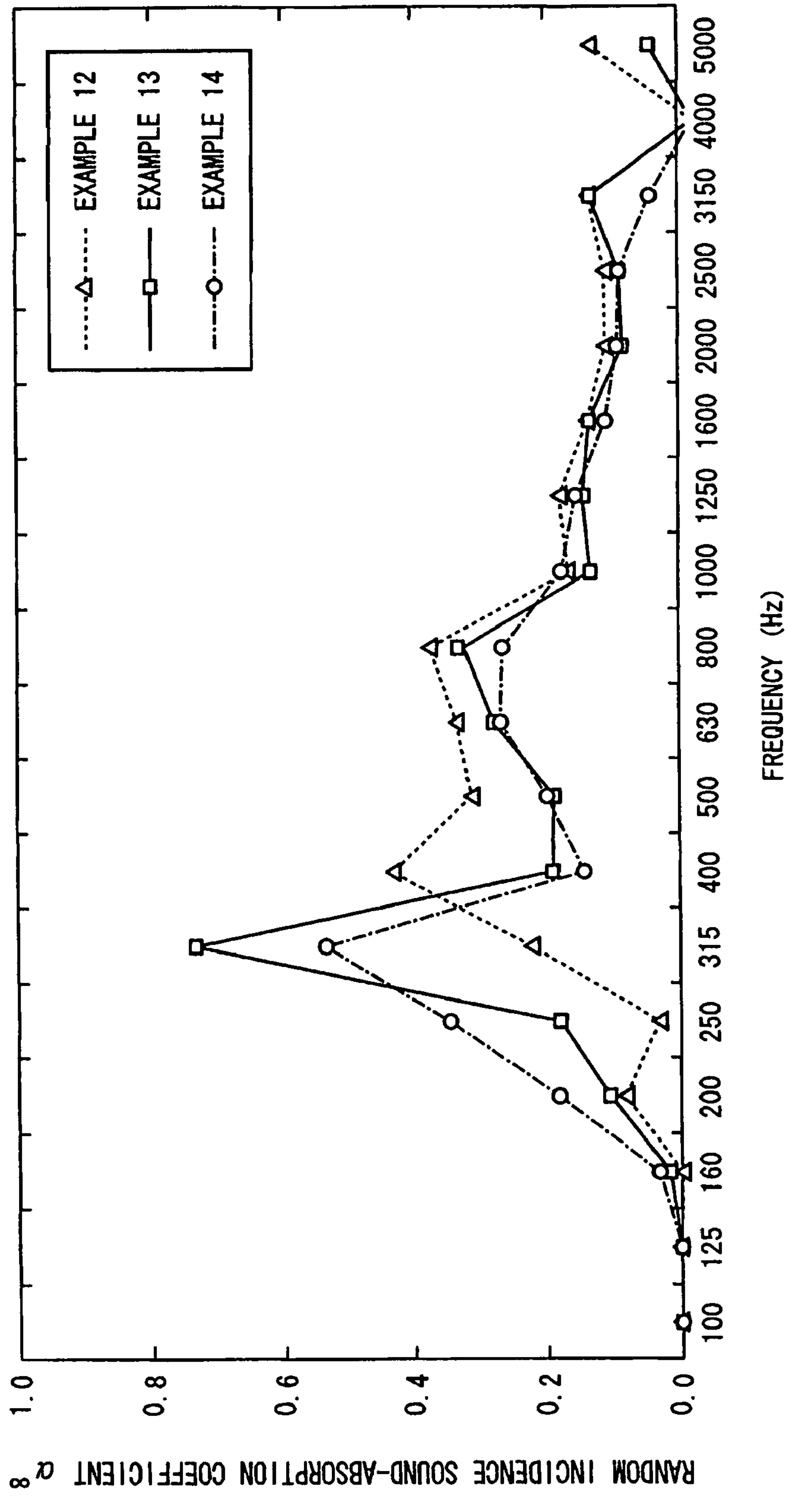
FIG. 10 is a graph which shows a relationship between frequencies and random incidence sound-absorption coefficients of Examples 12-14.

As shown in Table 1 and FIGS. 9 and 10, with regard to Examples 9-14, sound-absorption peaks with random incidence sound-absorption coefficients of approximately 0.33-0.73 around 250-400 Hz were recognized (sound-absorption peak at a frequency band lower than 500 Hz), and other sound-absorption peaks around 500-800 Hz were recognized. In reference to measured results shown in Table 1, it was recognized that the random incidence sound-absorption coefficients at a frequency band of 400 Hz or lower were improved if the thickness of the gastight air cells were in a range of 5-30 mm.

TABLE 1

| | | Organic hybrid sheet | | Size of backside air cells | | | Air-tightness | Peak value at frequency lower than 500 | | |
|---|---|---|---|---|---|---|---|---|---|---|
| | | Material name | Thickness (mm) | Height (mm) | Width (mm) | Thickness (mm) | (Tightly adhered or not) | Frequency (Hz) | Random incidence sound-absorption coefficient α∞ | Amplitude (μm) |
| Experiment 1 | Example 1 | DBS50/CPE50 | 0.7 | 100 | 100 | 5 | Tightly adhered | 400 | 0.4 | 6 |
| | Example 2 | DBS50/CPE50 | 0.7 | 100 | 100 | 10 | Tightly adhered | 315 | 0.36 | 7 |
| | Comparative example 1 | Si rubber | 0.7 | 100 | 100 | 5 | Tightly adhered | — | — | 6 |
| | Comparative example 2 | Si rubber | 0.7 | 100 | 100 | 10 | Tightly adhered | — | — | 7 |
| Experiment 2 | Example 3 | DBS50/CPE50 | 1 | 100 | 100 | 10 | Tightly adhered (completely gastight frame) | 315 | 0.44 | 5 |
| | Example 4 | DBS50/CPE50 | 1 | 100 | 100 | 10.1 | Tightly adhered (frame/argil/acrylic board) | 400 | 0.44 | 4.9 |
| | Example 5 | DBS50/CPE50 | 1 | 100 | 100 | 10.1 | Tightly adhered (frame/argil/floor) | 400 | 0.42 | 4.8 |
| | Comparative example 3 | DBS50/CPE50 | 1 | 100 | 100 | 10 | Not tightly adhered (frame/floor) | — | — | 0.5 |
| Experiment 3 | Example 6 | DBS50/CPE50 | 1 | 75 | 75 | 10 | Tightly adhered | 315 | 0.33 | 4 |
| | Example 7 | DBS50/CPE50 | 1 | 100 | 100 | 10 | Tightly adhered | 315 | 0.36 | 5 |
| | Example 8 | DBS50/CPE50 | 1 | 150 | 150 | 10 | Tightly adhered | 250 | 0.3 | 6 |
| | Comparative example 4 | Si rubber | 1 | 150 | 150 | 10 | Tightly adhered | — | — | 6 |
| | Comparative example 5 | GW(32K) | 10 | — | — | — | — | — | — | — |
| | Comparative example 6 | DBS7O/CPE3O | 1 | 1000 | 1000 | 10 | Tightly adhered | Low | Small | 100 |
| | Comparative example 7 | DBS7O/CPE3O | 1 | 10 | 10 | 10 | Tightly adhered | Low | Small | 0.1 |
| Experiment 4 | Example 9 | DBS7O/CPE3O | 1 | 100 | 100 | 10 | Tightly adhered | 315 | 0.33 | 4 |
| | Example 10 | DBS7O/CPE3O | 1 | 100 | 100 | 20 | Tightly adhered | 315 | 0.47 | 5 |
| | Example 11 | DBS7O/CPE3O | 1 | 100 | 100 | 30 | Tightly adhered | 250 | 0.42 | 6 |
| | Example 12 | DBS7O/CPE3O | 1.5 | 100 | 100 | 10 | Tightly adhered | 400 | 0.43 | 3 |
| | Example 13 | DBS7O/CPE3O | 1.5 | 100 | 100 | 20 | Tightly adhered | 315 | 0.73 | 4 |
| | Example 14 | DBS7O/CPE3O | 1.5 | 100 | 100 | 30 | Tightly adhered | 315 | 0.53 | 5 |

"Experiment 5"

Examples 15 and 16

In these examples, a pair of organic hybrid sheets was prepared which was produced by mixing CPE and DBS at a mass ratio of DBS/CPE=70/30 and which had thickness of 0.3 and 3.0 mm. Moreover, a pair of spacer members having a thickness of 30 mm was prepared which was made from wood, and which had aperture portions of a length of 100 mm and width of 100 mm formed in matrix state and separated by a wall portion that had a width of 9 mm. A backside plate was prepared which had thickness of 20 mm and which was made from acrylic resin. The organic hybrid sheet, the spacer member and the backside plate described above were combined so as to be overlapped on each other and were tightly attached to each other by using an adhesive. Therefore, the sound absorbing bodies of Examples 15 and 16 shown in Table 2 that had a length of 1 m, width of 1 m and thickness of 50.3 and 53.0 mm respectively were produced.

Comparative Examples 8 and 9

Except for using an organic hybrid sheet which had thickness of 0.2 mm or 5 mm, sound-absorbing bodies of Comparative examples 8 and 9 were made in the same manner as above-described Examples 15 and 16.

The random incidence sound-absorption coefficients of the sound-absorbing bodies of Examples 15 and 16 and Comparative examples 8 and 9 were measured. Measured results were shown in Table 2 and FIG. 11.

Figure 11:
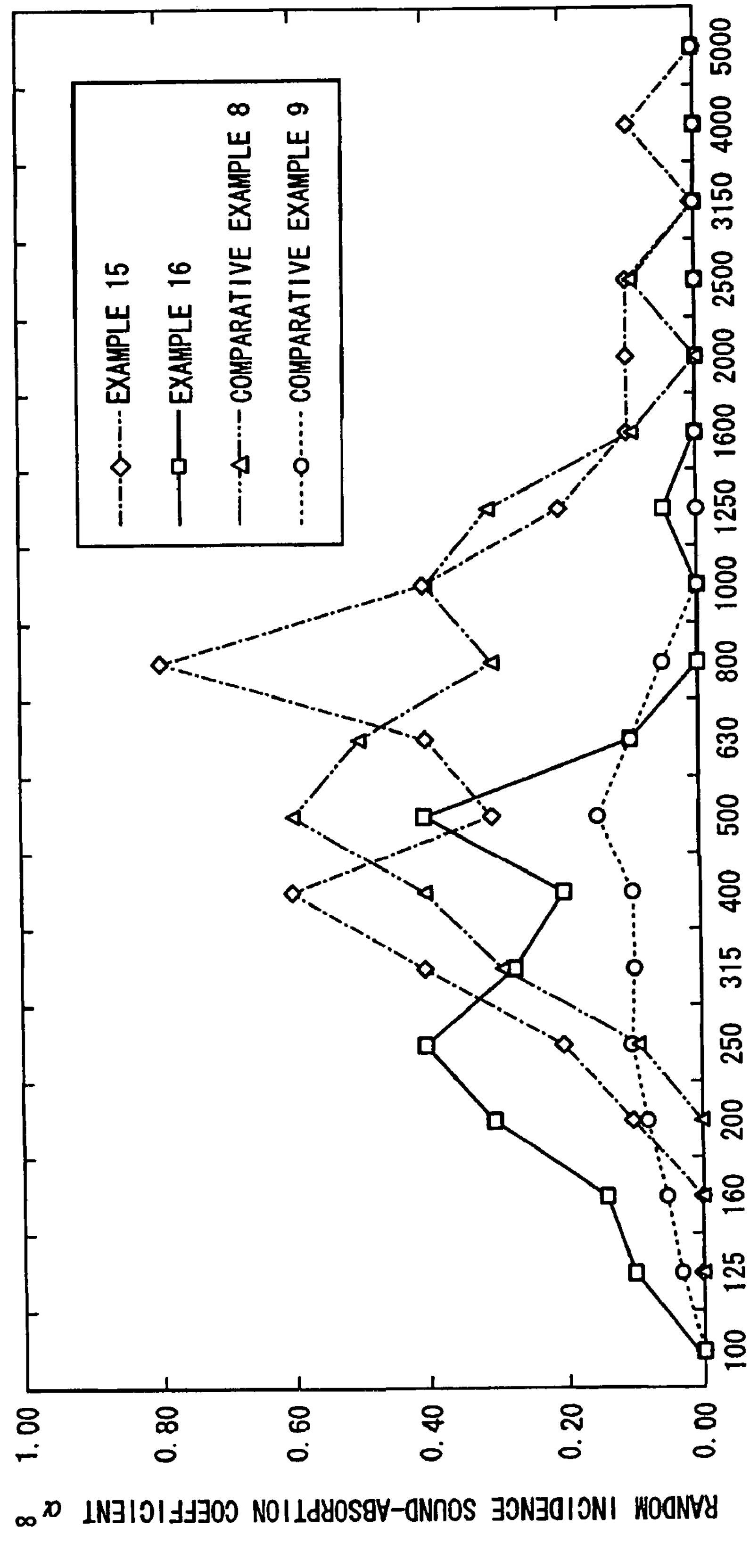
FIG. 11 is a graph which shows a relationship between frequencies and random incidence sound-absorption coefficients of Examples 15 and 16 and Comparative examples 8 and 9.

As shown in Table 2 and FIG. 11, with regard to Example 15, a sound-absorption peak of a random incidence sound-absorption coefficient of approximately 0.60 around 400 Hz was recognized, and another sound-absorption peak of a random incidence sound-absorption coefficient of approximately 0.80 around 500 Hz was recognized.

Moreover, with regard to Example 16, a sound-absorption peak of a random incidence sound-absorption coefficient of approximately 0.40 around 250 Hz was recognized, and another sound-absorption peak of a random incidence sound-absorption coefficient of approximately 0.40 around 500 Hz was recognized.

On the other hand, with regard to Comparative example 8, a sound-absorption peak of a random incidence sound-absorption coefficient of 0.60 around 500 Hz was recognized, and another sound-absorption peak of a random incidence sound-absorption coefficient of 0.40 around 1000 Hz was recognized. However, no sound-absorption peak was recognized at a frequency band of 400 Hz or lower.

Moreover, with regard to Comparative example 9, a sound-absorption peak of a random incidence sound-absorption coefficient of 0.15 around 500 Hz was recognized. However, no sound-absorption peak was recognized at a frequency band of 400 Hz or lower.

As described above, with regard to Examples 15 and 16, sound absorption peaks were recognized at a frequency band of 400 Hz or lower when a thickness of the organic hybrid sheet was set so as to be in a range of 0.3-3.0 mm, and it was recognized that Examples 15 and 16 indicate excellent sound absorption characteristics especially with regard to a low tone range. On the other hand, with regard to Comparative examples 8 and 9, no sound absorption peaks were recognized at a frequency band of 400 Hz or lower, and it was recognized that Comparative examples 8 and 9 had poor sound absorption characteristics with regard to a low tone range.

"Experiment 6"

Examples 17 and 18

In these examples, a couple organic hybrid sheets were prepared which had thickness of 1 mm, and one of the sheets was produced by mixing CPE and DBS at a mass ratio of DBS/CPE=20/80 and another sheet was produced by mixing CPE and DBS at a mass ratio of DBS/CPE=80/20. Moreover, a couple of spacer members having a thickness of 10 mm were prepared which were made from wood, and which had aperture portions of a length of 100 mm and width of 100 mm formed in matrix state and separated by wall portions that had width of 9 mm. A backside plate was prepared which had thickness of 20 mm and which was made from acrylic resin. The organic hybrid sheets, the spacer members and the backside plate described above were combined so as to be overlapped on each other and were tightly attached to each other by using an adhesive. Therefore, the sound absorbing bodies of Examples 17 and 18 shown in Table 2 that had a length of 1 m, width of 1 m and thickness of 31 mm were produced.

Comparative Examples 10 and 11

Except for using a pair of organic hybrid sheets which were produced by mixing CPE and DBS at a mass ratio of DBS/CPE=0/100 and a mass ratio of DBS/CPE=90/10, sound-absorbing bodies of Comparative examples 10 and 11 were made in the same manner as above-described Examples 17 and 18.

The random incidence sound-absorption coefficients of the sound-absorbing bodies of Examples 17 and 18 and Comparative examples 10 and 11 were measured. Measured results were shown in Table 2 and FIG. 12.

Figure 12:
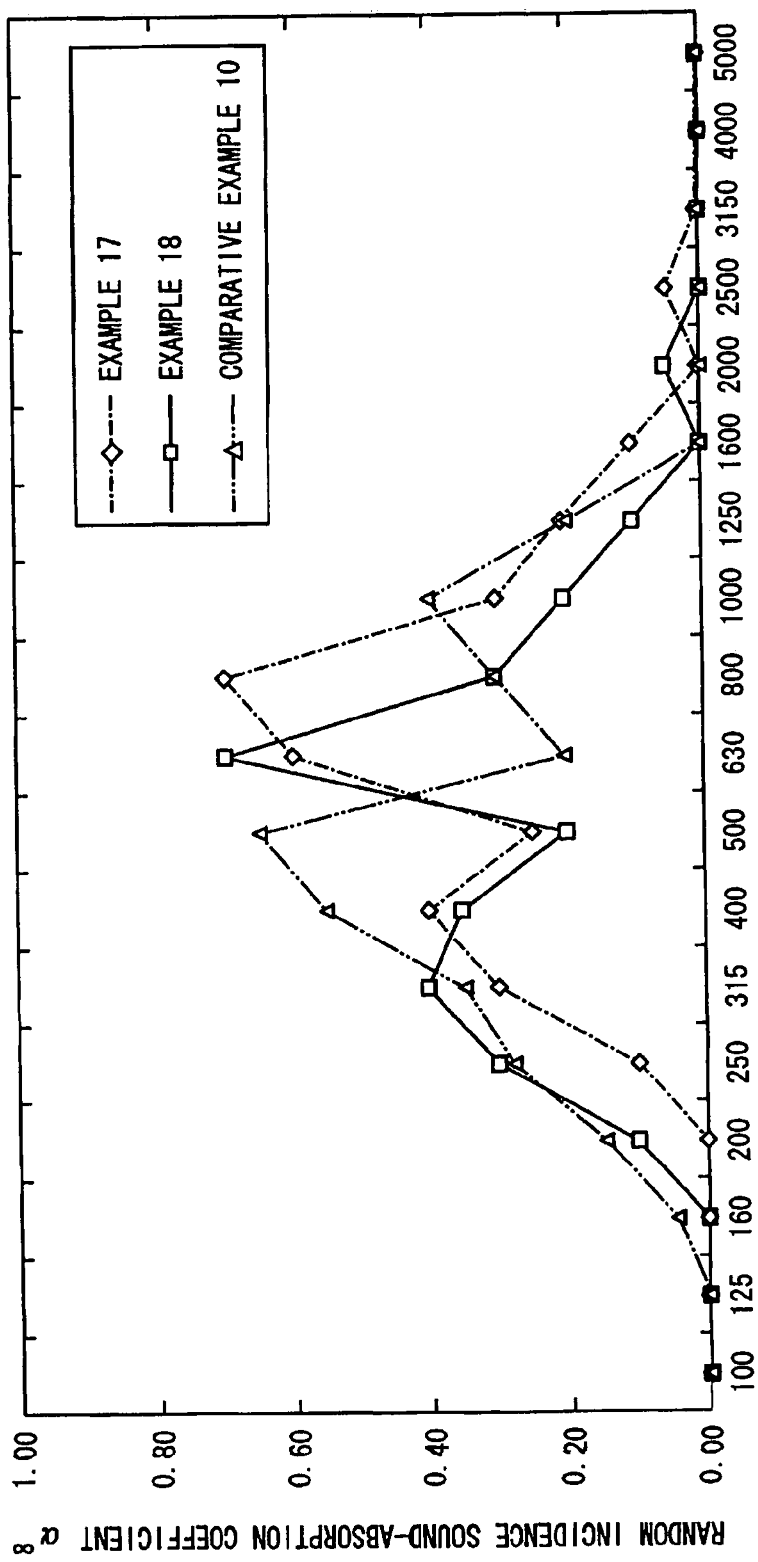
FIG. 12 is a graph which shows a relationship between frequencies and random incidence sound-absorption coefficients of Examples 17 and 18 and Comparative example 10.

As shown in Table 2 and FIG. 12, with regard to Example 17, a sound-absorption peak of a random incidence sound-absorption coefficient of approximately 0.40 around 400 Hz was recognized, and another sound-absorption peak of a random incidence sound-absorption coefficient of approximately 0.70 around 800 Hz was recognized.

Moreover, with regard to Example 18, a sound-absorption peak of a random incidence sound-absorption coefficient of approximately 0.40 around 315 Hz was recognized, and another sound-absorption peak of a random incidence sound-absorption coefficient of approximately 0.70 around 630 Hz was recognized.

On the other hand, with regard to Comparative example 10, a sound-absorption peak of a random incidence sound-absorption coefficient of 0.65 around 500 Hz was recognized, and another sound-absorption peak of a random incidence sound-absorption coefficient of 0.40 around 1000 Hz was recognized. However, no sound-absorption peak was recognized at a frequency band of 400 Hz or lower.

Moreover, with regard to Comparative example 11, the organic hybrid sheet was brittle. Therefore, it was not possible to measure a sound-absorption coefficient.

As described above, with regard to Examples 17 and 18, in a case of using the organic hybrid sheets in which CPE and DBS were mixed at a mass ratio of DBS/CPE=20/80-80/20, sound absorption peaks of random incidence sound-absorption coefficients of 0.3 or larger were recognized at a frequency band of 400 Hz or lower. It was recognized that Examples 17 and 18 indicate excellent sound absorption characteristics especially with regard to a low tone range. On the other hand, with regard to Comparative example 10, no sound absorption peaks were recognized at a frequency band of 400 Hz or lower because a mixing ration of chlorinated polyethylene was too high, and it was recognized that Comparative example 10 had poor sound absorption characteristics with regard to a low tone range. Moreover, with regard to Comparative example 11, it was impossible to use the sheet as the sound absorption material because a mixing ration of chlorinated polyethylene was too low and the sheet was too brittle.

"Experiment 7"

Comparative Example 12

An organic hybrid sheet was prepared which had thickness of 1 mm and was produced by mixing CPE and DBS at a mass ratio of DBS/CPE=50/50. Moreover, a spacer member having a thickness of 3 mm was prepared which were made from wood, and which had aperture portions of a length of 100 mm and width of 100 mm formed in matrix state and separated by a wall portion that had width of 9 mm. A backside plate was prepared which had thickness of 20 mm and which was made from acrylic resin. The organic hybrid sheet, the spacer member and the backside plate described above were combined so as to be overlapped on each other and were tightly attached to each other by using an adhesive. Therefore, the sound absorbing bodies of Comparative example 12 shown in Table 2 that had a length of 1 m, width of 1 m and thickness of 24 mm was produced.

A random incidence sound-absorption coefficient of the sound-absorbing body of Comparative examples 12 was measured. Measured results were shown in Table 2 and FIG. 13.

Figure 13:
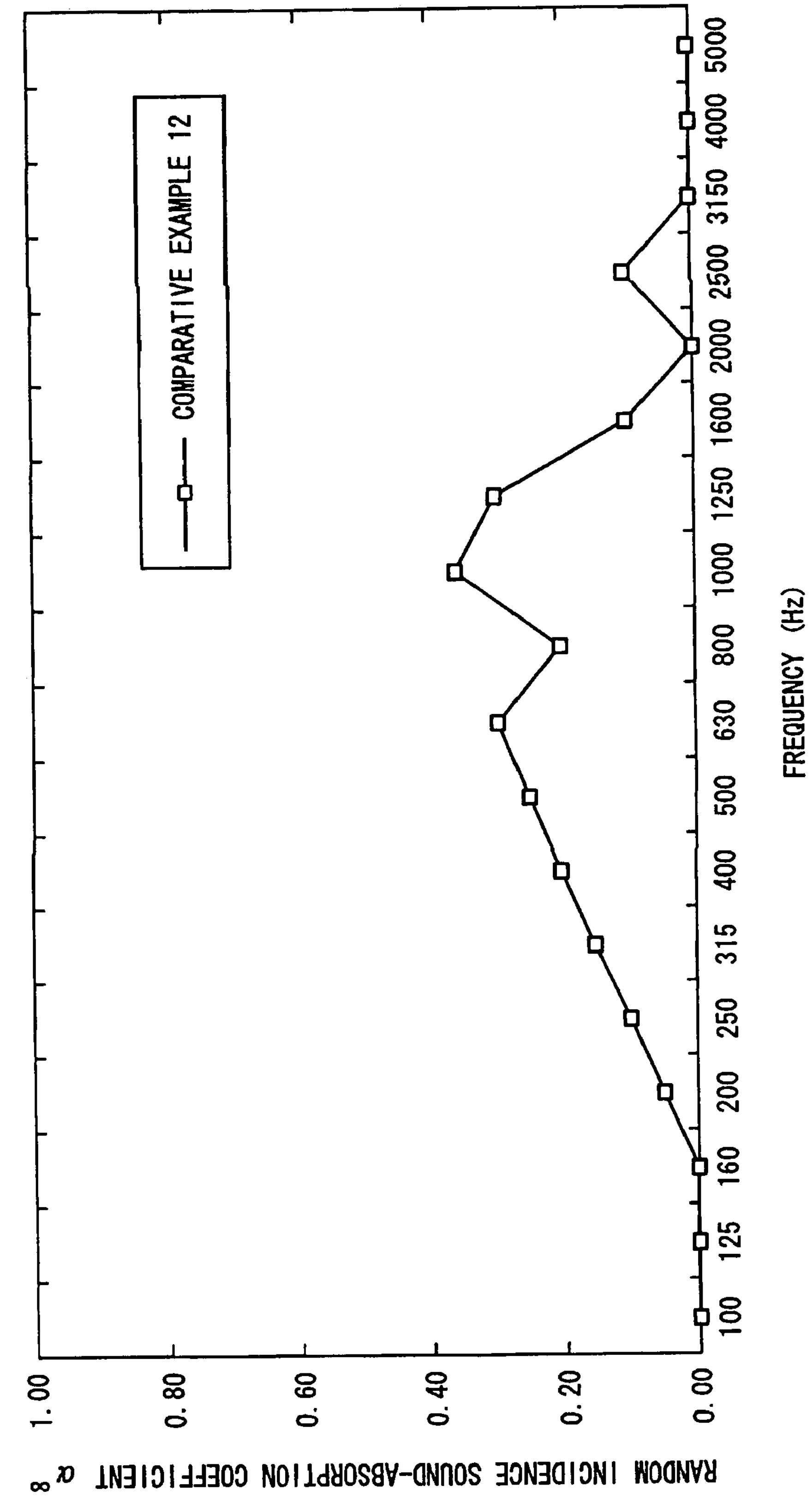
FIG. 13 is a graph which shows a relationship between frequencies and random incidence sound-absorption coefficients of Comparative example 12.

As shown in Table 2 and FIG. 13, with regard to Comparative example 12, a sound-absorption peak of a random incidence sound-absorption coefficient of approximately 0.30 around 630 Hz was recognized, and another sound-absorption peak of a random incidence sound-absorption coefficient of approximately 0.36 around 1000 Hz was recognized. However, no sound-absorption peak was recognized at a frequency band of 400 Hz or lower.

As described above, with regard to Comparative example 12, no sound absorption peaks were recognized at a frequency band of 400 Hz or lower because the backside air cell had the thickness of 3 mm and that was too small, and it was recognized that Comparative example 12 had poor sound absorption characteristics with regard to a low tone range.

"Experiment 8"

Examples 19 and 20

In these examples, a pair of organic hybrid sheets were prepared which were produced by mixing diethylhexyl phthalate (DEHP) and polyvinyl chloride (PVC) at a mass ratio of DEHP/PVC=50/50 and one of which had thickness of 1 mm and another had thickness of 1.5 mm. Moreover, a pair of spacer members having a thickness of 30 mm was prepared which was made from wood, and which had aperture portions of a length of 100 mm and width of 100 mm formed in matrix state and separated by wall portions that had a width of 9 mm. A backside plate was prepared which had thickness of 20 mm and which was made from acrylic resin. The organic hybrid sheets, the spacer members and the backside plates described above were combined so as to be overlapped and were tightly attached to each other by using an adhesive. Therefore, the sound absorbing bodies of Examples 19 and 20 shown in Table 2 that had a length of 1 m, width of 1 m and thickness of 51-51.5 mm were produced.

Comparative Examples 13 and 14

Except for using a pair of organic hybrid sheets which had thickness of 0.1 mm/5 mm, sound-absorbing bodies of Comparative examples 13 and 14 were made in the same manner as above-described Examples 19 and 20.

The random incidence sound-absorption coefficients of the sound-absorbing bodies of Examples 19 and 20 and Comparative examples 13 and 14 were measured. Measured results were shown in Table 2 and FIG. 14.

another sound-absorption peak of a random incidence sound-absorption coefficient of approximately 0.40 around 500 Hz was recognized.

On the other hand, with regard to Comparative example 13, a sound-absorption peak of a random incidence sound-absorption coefficient of 0.64 around 630 Hz was recognized. However, no sound-absorption peaks were recognized at a frequency band of 400 Hz or lower.

Moreover, with regard to Comparative example 14, a sound-absorption peak of a random incidence sound-absorption coefficient of 0.14 around 500 Hz was recognized. However, no sound-absorption peaks were recognized at a frequency band of 400 Hz or lower.

As described above, with regard to Examples 19 and 20, sound absorption peaks were recognized at a frequency band of 400 Hz or lower when a thickness of the organic hybrid sheets were set so as to be in a range of 0.3-3.0 mm, and it was recognized that Examples 19 and 20 indicate excellent sound absorption characteristics especially with regard to a low tone range. On the other hand, with regard to Comparative examples 13 and 14, no sound absorption peaks were recognized at a frequency band of 400 Hz or lower, and it was recognized that Comparative examples 13 and 14 had poor sound absorption characteristics with regard to a low tone range.

TABLE 2

| | | Organic hybrid sheet | | Size of backside air cell | | | Air-tightness | Peak value at 400 Hz or lower | | |
|---|---|---|---|---|---|---|---|---|---|---|
| | | material name | Thickness (mm) | Height (mm) | Width (mm) | Thickness (mm) | (Tightly adhered or not) | Frequency (Hz) | random incidence sound-absorption coefficient α∞ | amplitude (μm) |
| Experiment 5 | Example 15 | DBS70/CPE30 | 0.3 | 100 | 100 | 30 | Tightly adhered | 400 | 0.6 | 10 |
| | Example 16 | DBS70/CPE30 | 3.0 | 100 | 100 | 30 | Tightly adhered | 250 | 0.4 | 4 |
| | Comparative example 8 | DBS70/CPE30 | 0.2 | 100 | 100 | 30 | Tightly adhered | — | — | — |
| | Comparative example 9 | DBS70/CPE30 | 5.0 | 100 | 100 | 30 | Tightly adhered | — | — | — |
| Experiment 6 | Example 17 | DBS20/CPE80 | 1.0 | 100 | 100 | 10 | Tightly adhered | 400 | 0.4 | 5 |
| | Example 18 | DBS80/CPE20 | 1.0 | 100 | 100 | 10 | Tightly adhered | 315 | 0.4 | 4 |
| | Comparative example 10 | DBS0/CPE100 | 1.0 | 100 | 100 | 10 | Tightly adhered | — | — | — |
| | Comparative example 11 | DBS90/CPE10 | 1.0 | Impossible to measure | | | | | | |
| Experiment 7 | Comparative example 12 | DBS50/CPE50 | 1.0 | 100 | 100 | 3 | Tightly adhered | — | — | — |
| Experiment 8 | Example 19 | DEHP50/PVC50 | 1.0 | 100 | 100 | 30 | Tightly adhered | 315 | 0.6 | 5 |
| | Example 20 | DEHP50/PVC50 | 1.5 | 100 | 100 | 30 | Tightly adhered | 250 | 0.6 | 4 |
| | Comparative example 13 | DEHP50/PVC50 | 0.1 | 100 | 100 | 30 | Tightly adhered | — | — | — |
| | Comparative example 14 | DEHP50/PVC50 | 5.0 | 100 | 100 | 30 | Tightly adhered | — | — | — |

Figure 14:
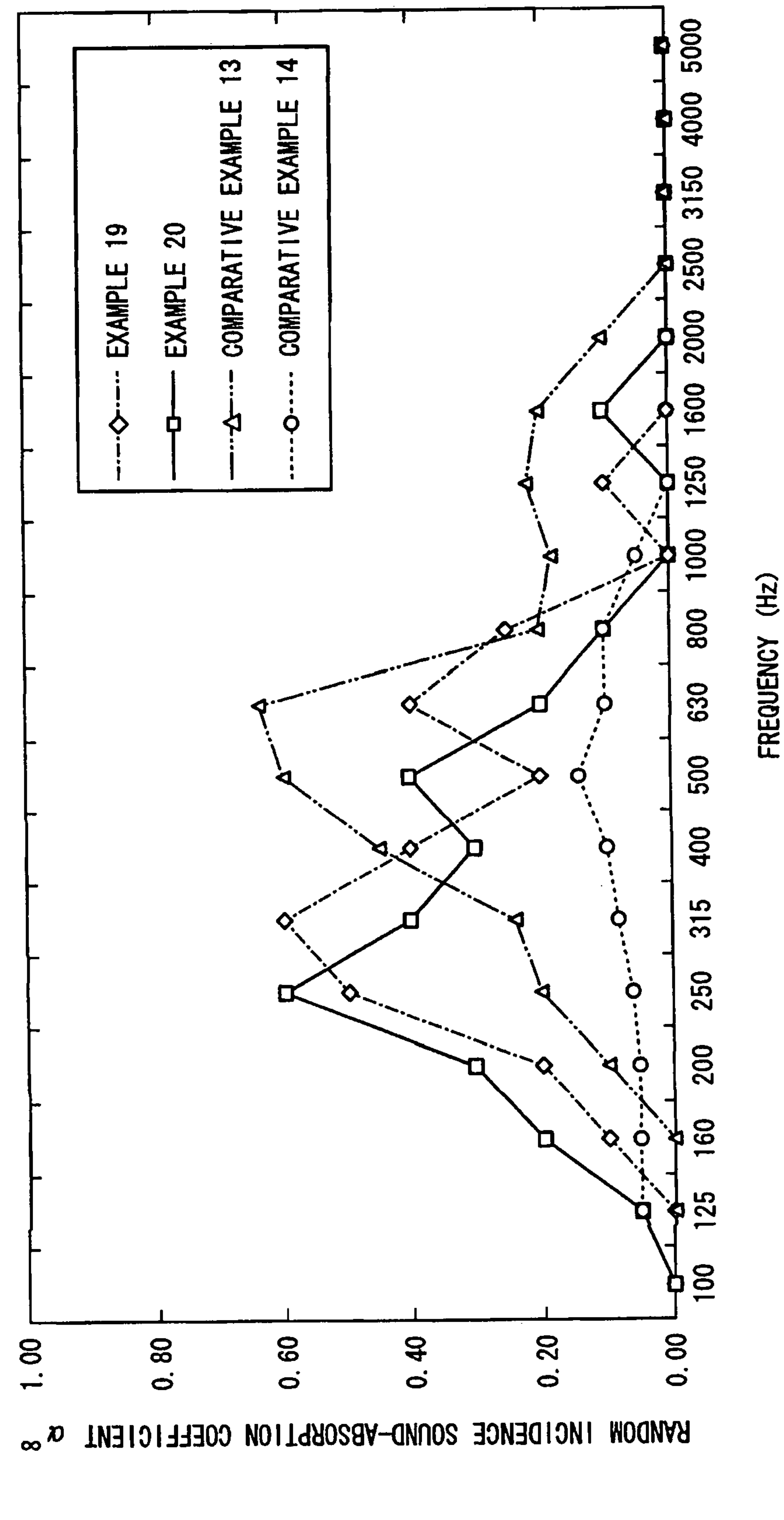
FIG. 14 is a graph which shows a relationship between frequencies and random incidence sound-absorption coefficients of Examples 19 and 20 and Comparative examples 13 and 14.

As shown in Table 2 and FIG. 14, with regard to Example 19, a sound-absorption peak of a random incidence sound-absorption coefficient of approximately 0.60 around 315 Hz was recognized, and another sound-absorption peak of a random incidence sound-absorption coefficient of approximately 0.40 around 630 Hz was recognized.

Moreover, with regard to Example 20, a sound-absorption peak of a random incidence sound-absorption coefficient of approximately 0.60 around 250 Hz was recognized, and While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A sound-absorbing body comprising:

an organic hybrid sheet constituted from an organic low-molecular material which is spread in a matrix polymer; and a gastight air cell which is closely provided at a backside of the organic hybrid sheet, wherein the organic hybrid sheet indicates both a first sound-absorption peak of a random incidence sound-absorption coefficient of 0.3 or higher at a first frequency band of 400 Hz or lower and a second sound-absorption peak of a random incidence sound-absorption coefficient of 0.3 or higher at a second frequency band higher than the first frequency band when the organic hybrid sheet is vibrated by applying air vibration caused by sound, because of adhering the organic hybrid sheet to the gastight air cell.

2. A sound-absorbing body according to claim 1, wherein a plurality of the gastight air cells is provided and the plurality of gastight air cells are separated from each other.

3. A sound-absorbing body according to claim 1, wherein the gastight air cell is formed in a block by a backside of the organic hybrid sheet, a backside portion which faces the backside of the organic hybrid sheet and a wall portion which stands on the backside portion toward the backside of the organic hybrid sheet and is arranged around an outside edge of the backside portion, and the wall portion and the backside of the organic hybrid sheet are tightly adhered to each other.

4. A sound-absorbing body according to claim 3, wherein the sound-absorbing body comprises a plurality of gastight air cells which are separated from each other by the wall portion.

5. A sound-absorbing body according to claim 1, wherein a thickness of the gastight air cell is in a range from 5 mm to 30 mm.

6. A sound-absorbing body according to claim 1, wherein a thickness of the organic hybrid sheet is in a range from 0.3 mm to 3 mm.

7. A sound-absorbing body according to claim 1, wherein the organic hybrid sheet is constituted by spreading N,N'-dicyclohexyl-2-benzothiazole sulfenamide in the matrix polymer which is made from chlorinated polyethylene, or the organic hybrid sheet is constituted by spreading diethylhexyl phthalate in the matrix polymer which is made from polyvinyl chloride.

* * * * *